United States Patent
Mrozek

(10) Patent No.: US 10,255,654 B2
(45) Date of Patent: Apr. 9, 2019

(54) FACILITATING DYNAMIC PARALLEL SCHEDULING OF COMMAND PACKETS AT GRAPHICS PROCESSING UNITS ON COMPUTING DEVICES

(71) Applicant: INTEL CORPORATION, Santa Clara, CA (US)

(72) Inventor: Michal Andrzej Mrozek, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/503,201

(22) PCT Filed: Sep. 12, 2014

(86) PCT No.: PCT/US2014/055452
§ 371 (c)(1),
(2) Date: Feb. 10, 2017

(87) PCT Pub. No.: WO2016/039774
PCT Pub. Date: Mar. 17, 2016

(65) Prior Publication Data
US 2017/0236246 A1 Aug. 17, 2017

(51) Int. Cl.
*G06T 1/20* (2006.01)
*G06F 9/48* (2006.01)
(Continued)

(52) U.S. Cl.
CPC .............. *G06T 1/20* (2013.01); *G06F 9/4881* (2013.01); *G06F 9/5027* (2013.01); *G06T 1/60* (2013.01);
(Continued)

(58) Field of Classification Search
CPC . G06T 1/20; G06T 1/60; G06F 9/4881; G06F 9/50; G06F 9/5027
(Continued)

(56) References Cited

U.S. PATENT DOCUMENTS 8,842,122 B2 * 9/2014 Nordlund .............. G06T 15/005
345/502
2002/0023118 A1 2/2002 Peled et al.
(Continued)

FOREIGN PATENT DOCUMENTS

WO 2013-178245 A1 12/2013

OTHER PUBLICATIONS

International Searching Authority at the Korean Intellectual Property Office, International Search Report and Written Opinion for International Patent Application No. PCT/US2014/055452, dated Jun. 8, 2015, 11 pages.
(Continued)

*Primary Examiner* — Jacinta M Crawford
(74) *Attorney, Agent, or Firm* — Womble Bond Dickinson (US) LLP

(57) ABSTRACT

A mechanism is described for facilitating parallel scheduling of multiple commands on computing devices. A method of embodiments, as described herein, includes detecting a command of a plurality of commands to be processed at a graphics processing unit (GPU), and acquiring one or more resources of a plurality of resources to process the command. The plurality of resources may include other resources being used to process other commands of the plurality of commands. The method may further include facilitating processing of the command using the one or more resources, wherein the command is processed in parallel with processing of the other commands using the other resources.

22 Claims, 18 Drawing Sheets

(51) Int. Cl.
  *G06F 9/50* (2006.01)
  *G06T 1/60* (2006.01)
(52) U.S. Cl.
  CPC .. *G06F 2209/483* (2013.01); *G06F 2209/484* (2013.01)
(58) Field of Classification Search
  USPC ........ 345/501, 503, 522, 530; 718/100, 102, 718/103, 104, 106, 107, 108
  See application file for complete search history.

(56) References Cited

U.S. PATENT DOCUMENTS

| | | | |
|---|---|---|---|
| 2008/0148271 A1 | 6/2008 | Leckie | |
| 2011/0050713 A1* | 3/2011 | McCrary | G06F 9/3851 345/522 |
| 2011/0321051 A1* | 12/2011 | Rastogi | G06F 9/4881 718/102 |
| 2012/0079498 A1 | 3/2012 | Kim et al. | |
| 2013/0147816 A1* | 6/2013 | Hartog | G06F 9/505 345/503 |
| 2013/0198757 A1 | 8/2013 | Kim et al. | |
| 2014/0259016 A1 | 9/2014 | Lottes et al. | |
| 2015/0143381 A1* | 5/2015 | Chin | G06F 9/485 718/104 |

OTHER PUBLICATIONS

Shinpei Kato et al: "TimeGraph: GPU Scheduling for Real-Time Multi-Tasking Environments", USENIX, May 2, 2011 (May 2, 2011), pp. 1-14.
International Preliminary Report on Patentability received for PCT Patent Application No. PCT/US2014/055452, dated Mar. 23, 2017, 9 pages.
European Search Report and Search Opinion Received for EP Application No. 14901504.2, dated Feb. 21, 2018, 8 pages.
Erik Lindholm et al: "NVIDIA Tesla: A Unified Graphics and Computing Architecture", IEEE Micro, IEEE Service Center, Los Alamitos, CA, US, vol. 27, No. 2, Mar. 2008 (Mar. 2008), pp. 39-55.

* cited by examiner

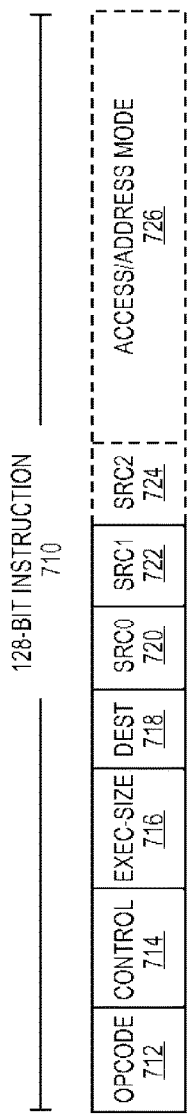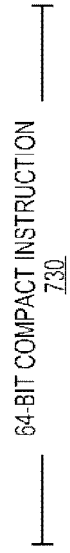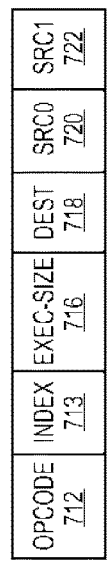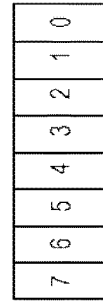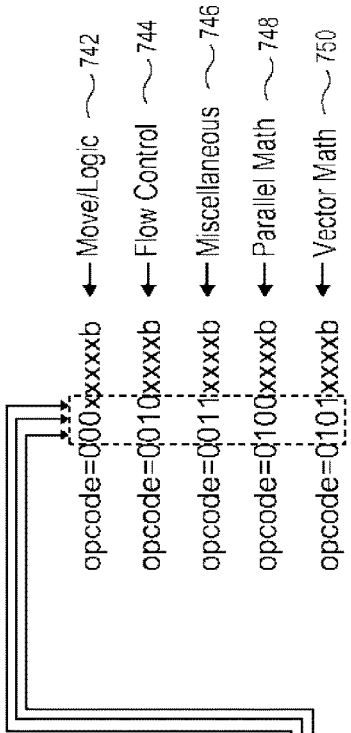
FIG. 7

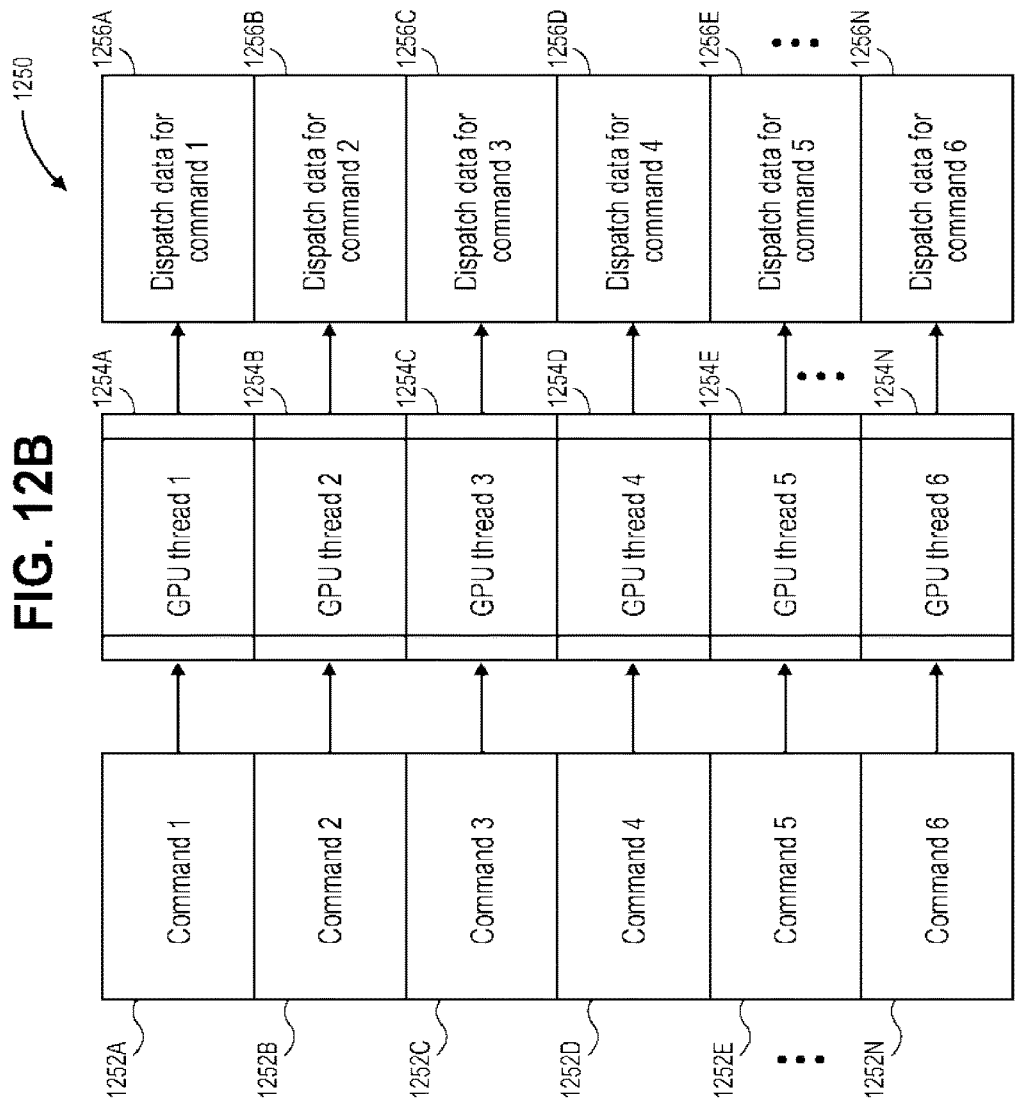

FACILITATING DYNAMIC PARALLEL SCHEDULING OF COMMAND PACKETS AT GRAPHICS PROCESSING UNITS ON COMPUTING DEVICES

CROSS-REFERENCE TO RELATED APPLICATION

This patent application is a U.S. National Phase Application under 35 U.S.C. § 371 of International Application No. PCT/US2014/055452, filed Sep. 12, 2014, entitled FACILITATING DYNAMIC PARALLEL SCHEDULING OF COMMAND PACKETS AT GRAPHICS PROCESSING UNITS ON COMPUTING DEVICES.

FIELD

Embodiments described herein generally relate to computers. More particularly, embodiments relate to a mechanism for facilitating dynamic parallel scheduling of command packets at graphics processing units on computing devices.

BACKGROUND

Conventional techniques provide for graphics drivers to run on the same thread as an application which forces the driver logic to execute on a single central processing unit ("CPU") core. In conventional techniques, dispatch information or command packets are put in buffers, known as queue buffers, and since only a single CPU thread is used for executing the driver logic, such queue buffers are created in a first-in-first-out ("FIFO")—like sequence which is inefficient as it causes bottlenecking and loss of important system resources, such as time, power, etc. For example, since there can be any number of command packets waiting in a queue to be processed by the graphics driver, the total scheduling time to process and dispatch a command packet that is low in the queue is multiplied by the amount of time taken by all of the command packets waiting in the queue that are to be processed and dispatched before it.

BRIEF DESCRIPTION OF THE DRAWINGS

Embodiments are illustrated by way of example, and not by way of limitation, in the figures of the accompanying drawings in which like reference numerals refer to similar elements.

FIG. 7 is a block diagram illustrating a graphics processor execution unit instruction format according to an embodiment.

FIG. 12B illustrates a transaction sequence for dynamic command buffer creation as facilitated by a parallel scheduling mechanism of FIG. 12A

DETAILED DESCRIPTION

Figure 1:
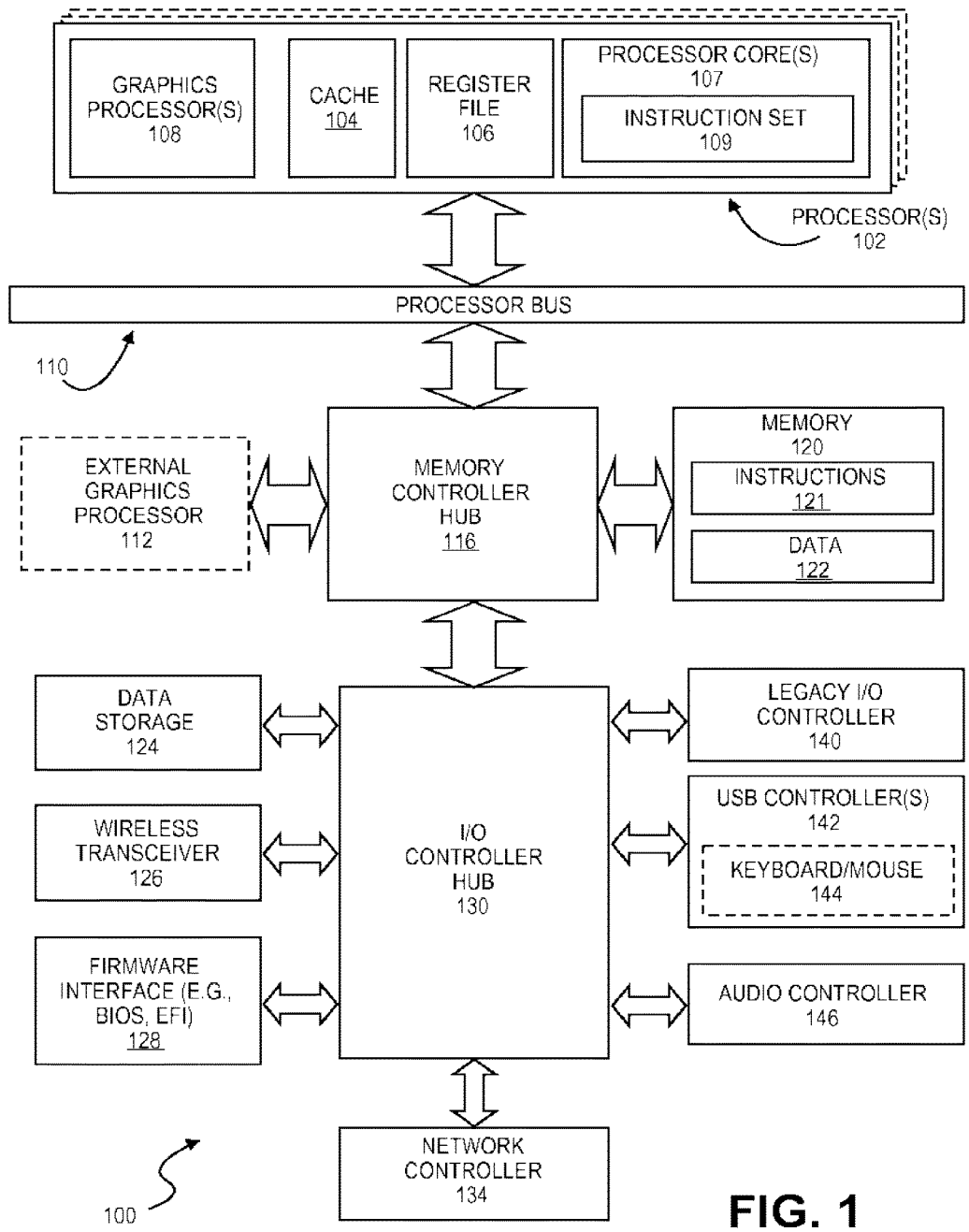
FIG. 1 is a block diagram of a data processing system, according to an embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for facilitating dynamic creation and application of parallel command buffers for graphics processing units on computing devices by promoting graphics processing unit ("GPU") from being a servant device of CPU to being an independent parallel scheduling device to allow for a more efficient parallel scheduling as opposed to the conventional CPU-based sequential scheduling. In one embodiment, driver logic may be moved from the CPU domain to the GPU domain such that the conventional thread limitation of CPUs is not applicable and in contrast, multiple GPU threads may be put to work in parallel.

Further, for example, open computing language ("OpenCL™"), such as OpenCL™ 2.0, which is regarded as an industry standard application programming interface ("API") for GPU-related computing offers a new graphics paradigm of nested parallelism which allows for enqueuing of kernels without having to come back to the host. Nested parallelism may be used to offer solutions to particular types of problems where the scale and magnitude of work may be known merely during the execution of the workload or after processing the nodes, such as in the case of graph traversal. In one embodiment, using nested parallelism, dynamic and parallel scheduling decisions may be made and executed at and by GPUs (as opposed to at and by CPUs).

Some conventional techniques provide for emulating logic, but emulating logic to use the CPU for controlling commands execution is till inefficient both in terms of time and power as many of the expensive command packets would still transition through a kernel mode driver and the CPU would still have to process the driver logic. Furthermore, most conventional techniques require additional hardware parts which add cost and size to the computing device.

For example, in one embodiment, OpenCL™ 2.0 may be used to provide direct access and use of kernels without having to involve the CPU, employing new hardware (e.g., hardware scheduler capable of creating command packets). This way, the direct involvement and intervention of the host CPU during execution of such workload is avoided which prevents the CPU from causing unnecessary delays and latencies and burning precious power just to support GPU executions. Further, with regard to writing to the batch buffer, a second level batch may be used to hold various commands and be written by the GPU.

Embodiments provide for a GPU compute runtime/driver logic employing a mechanism for facilitating parallel scheduling of command packages without having to require any additional hardware. In one embodiment, as aforementioned, driver logic may be moved from the conventional CPU domain to the GPU domain to gain from single instruction, multiple data ("SIMD") architecture of GPU and use any number of GPU hardware threads to handle any amount of user enqueue requests in a short amount of time. Embodiments provide for a technique that is appreciably efficient in terms of time, power, and resources, etc., and further provide for a seamless and effective processing path.

Figure 2:
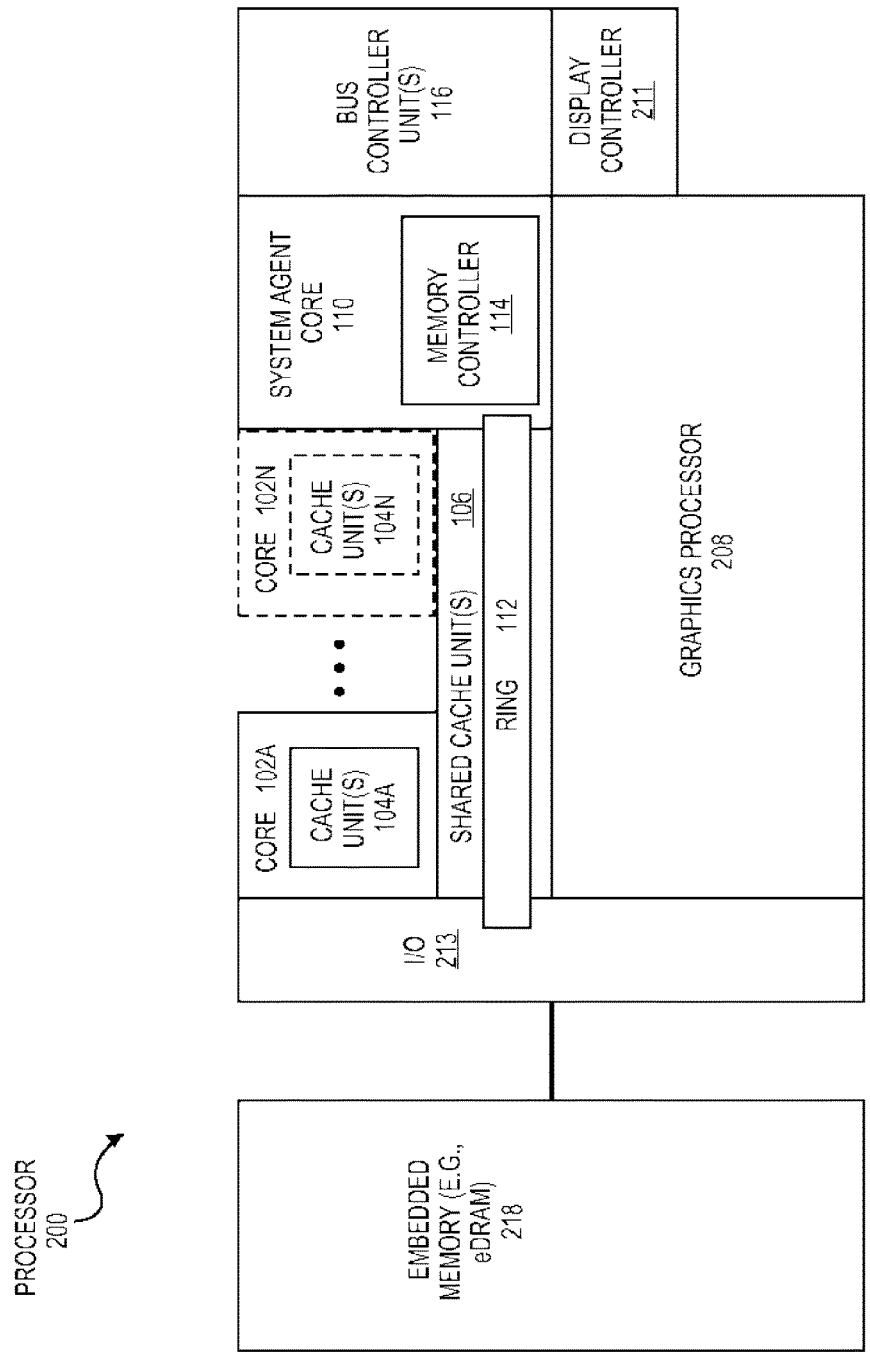
FIG. 2 is a block diagram of an embodiment of a processor having one or more processor cores, an integrated memory controller, and an integrated graphics processor.
Figure 3:
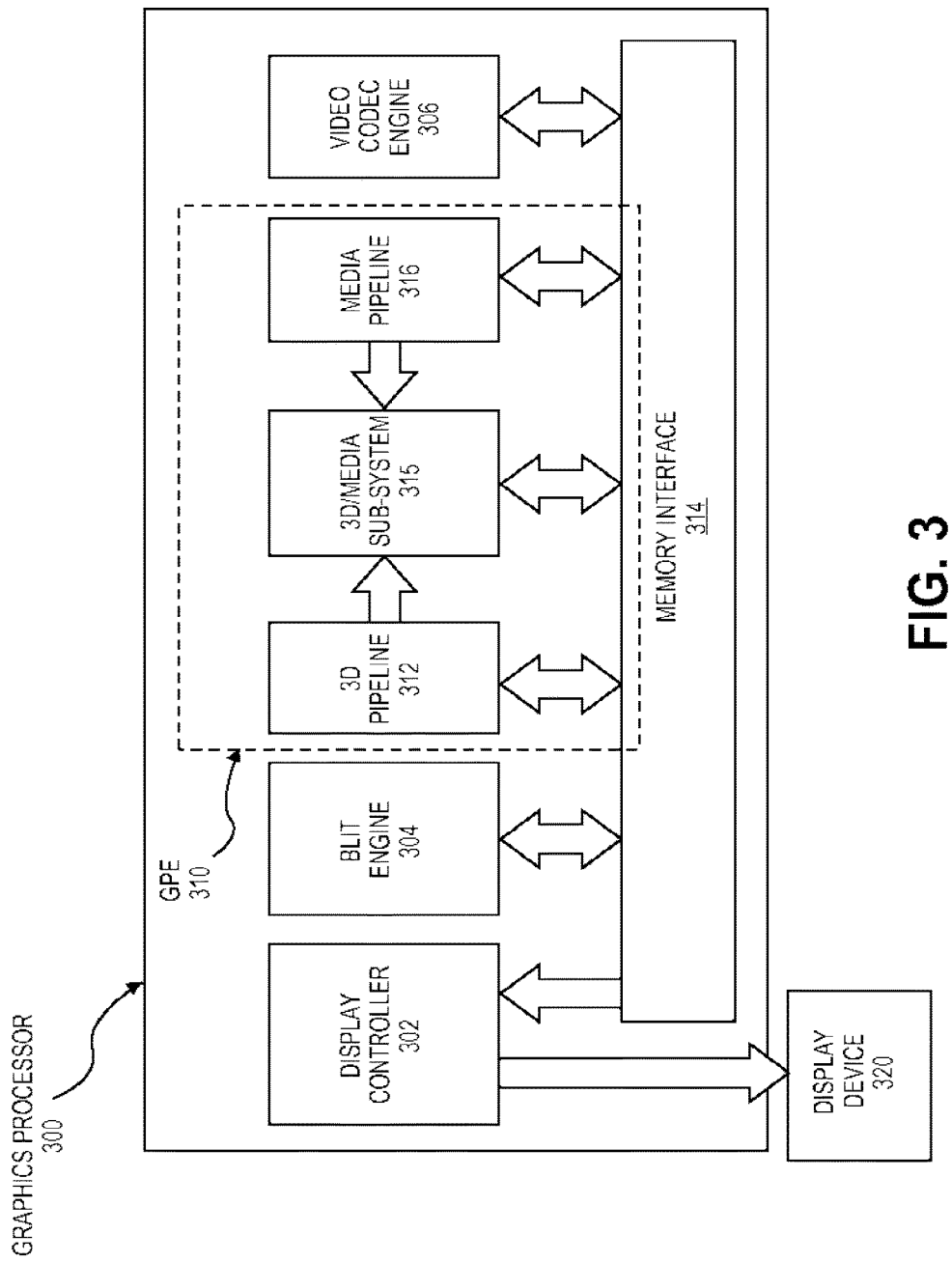
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
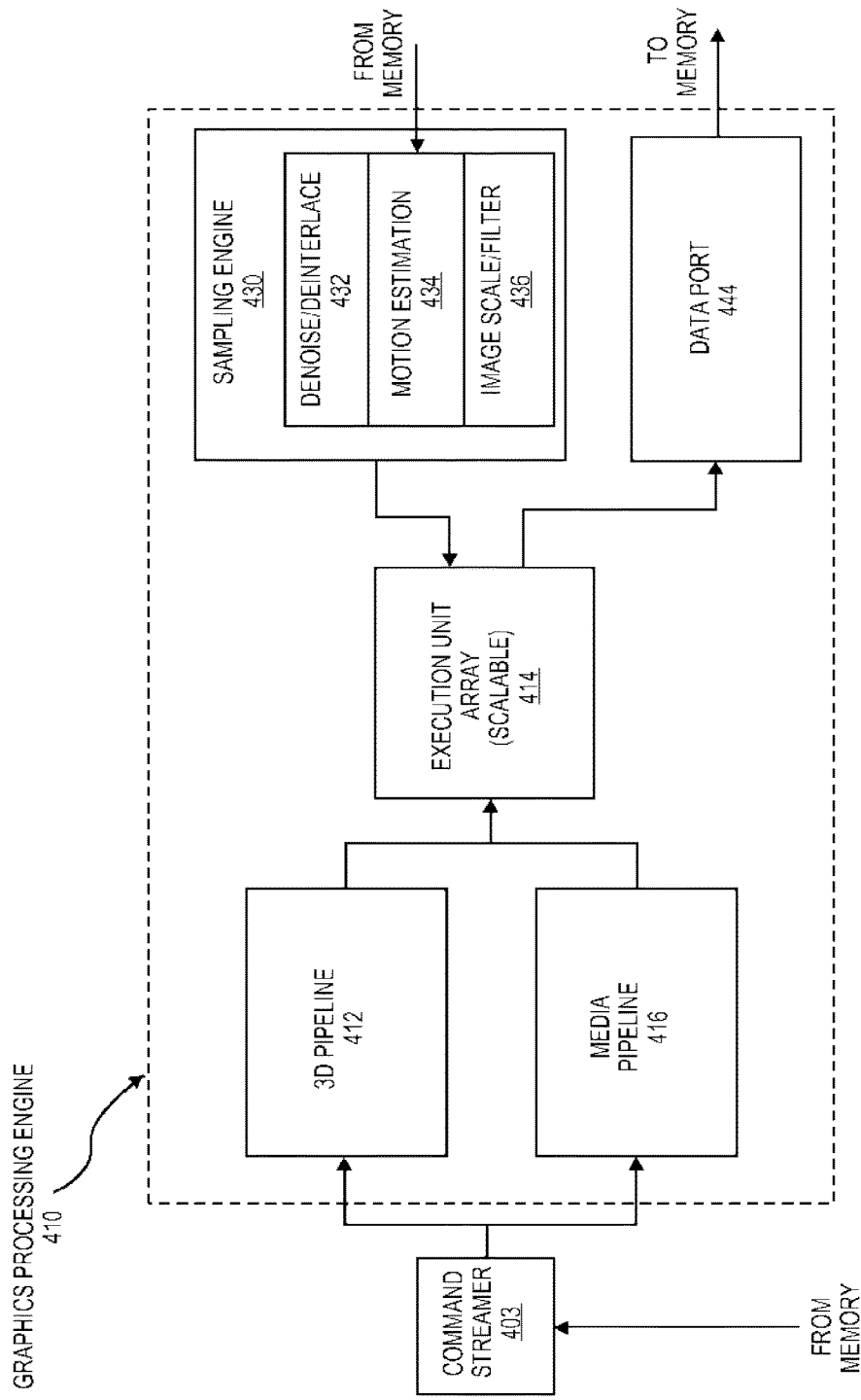
FIG. 4 is a block diagram of an embodiment of a graphics processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
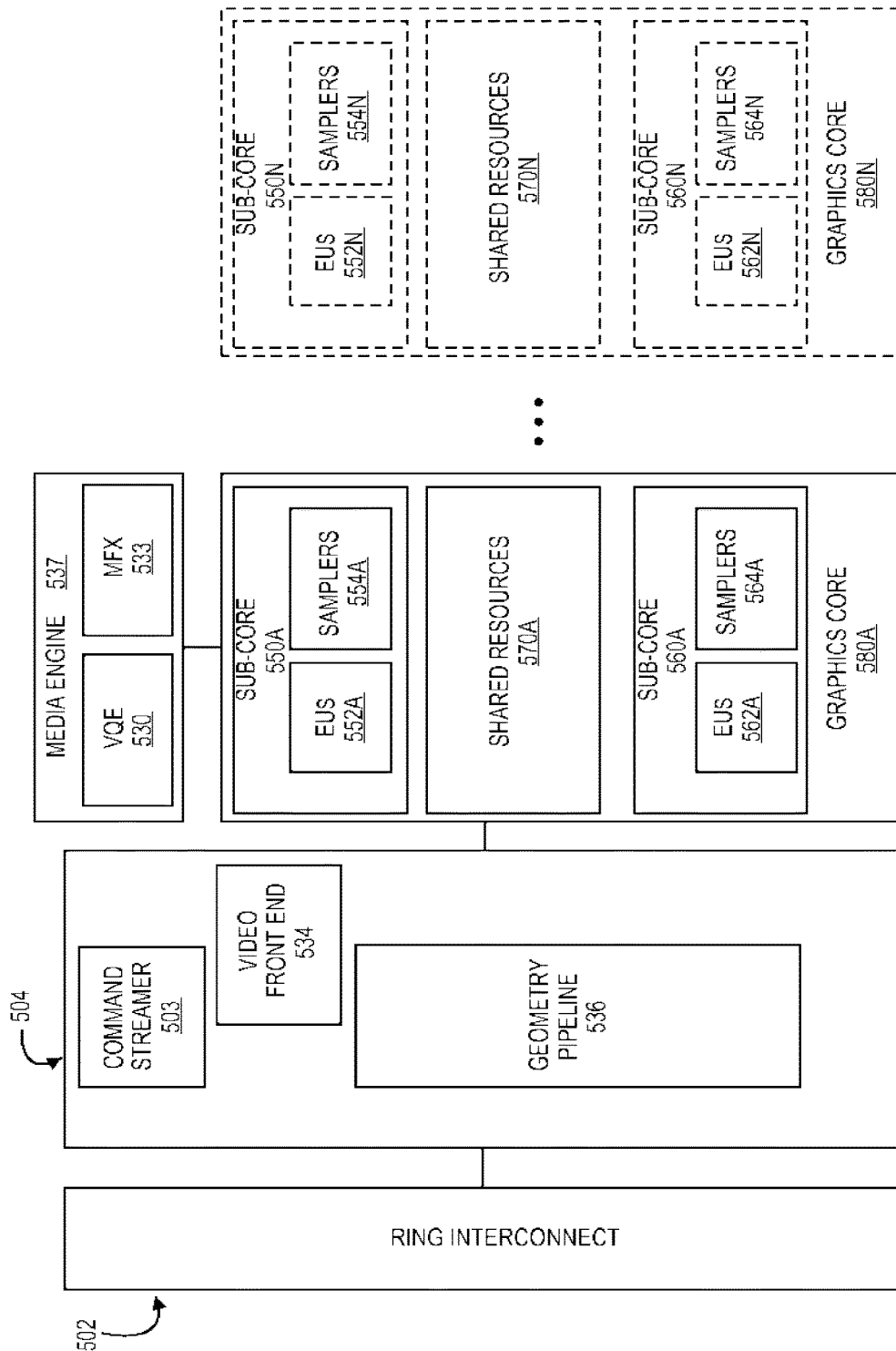
FIG. 5 is a block diagram of another embodiment of a graphics processor.
Figure 6:
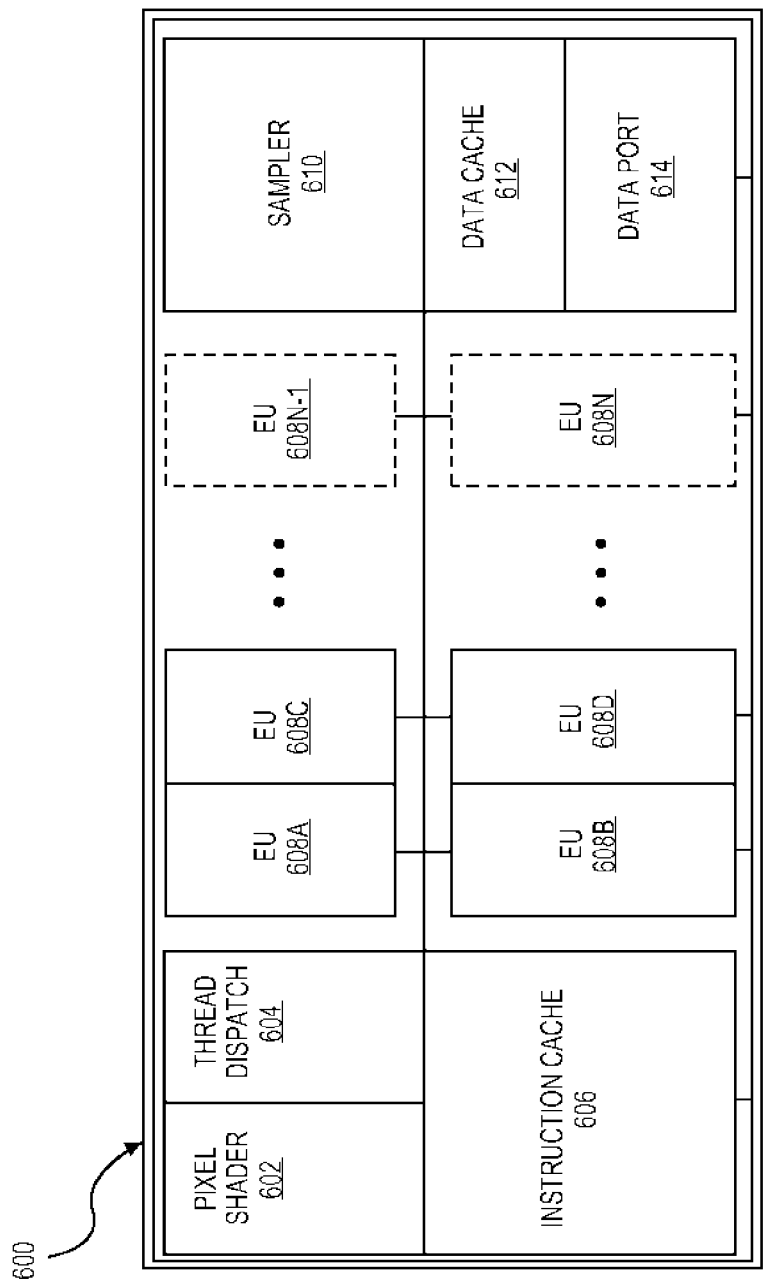
FIG. 6 illustrates thread execution logic including an array of processing elements employed in one embodiment of a graphics processing engine.

Execution Units—FIGS. 5-7

FIG. 5 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
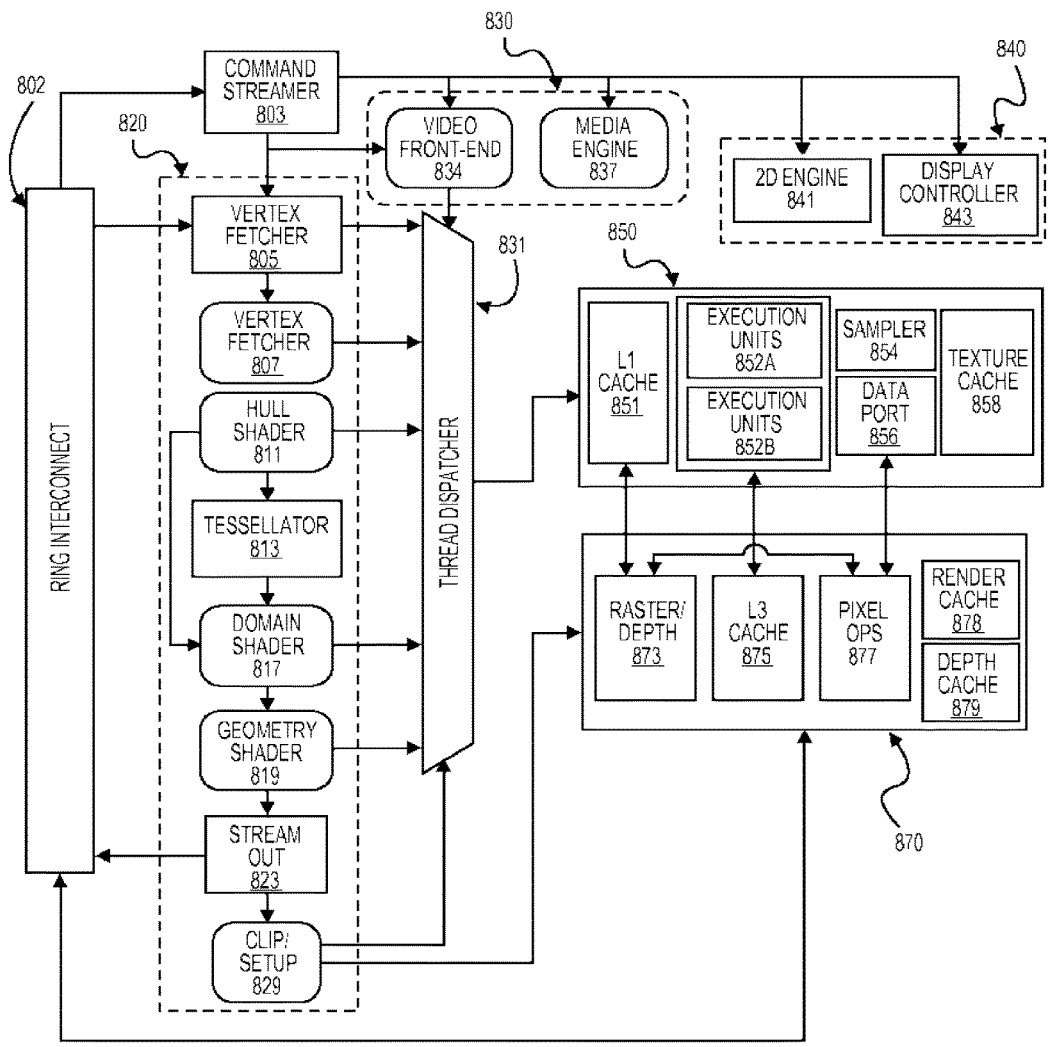
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL™) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9:
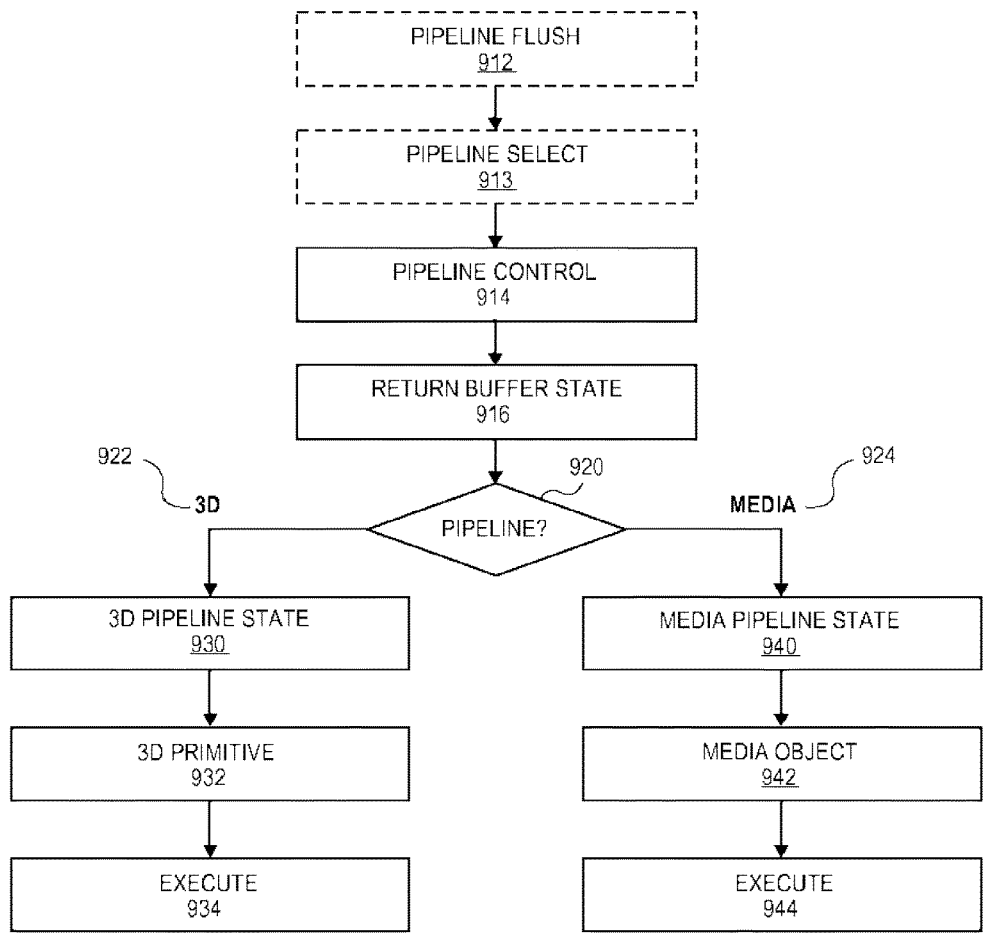
FIG. 9A is a block diagram illustrating a graphics processor command format according to an embodiment and FIG. 9B is a block diagram illustrating a graphics processor command sequence according to an embodiment.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings. Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
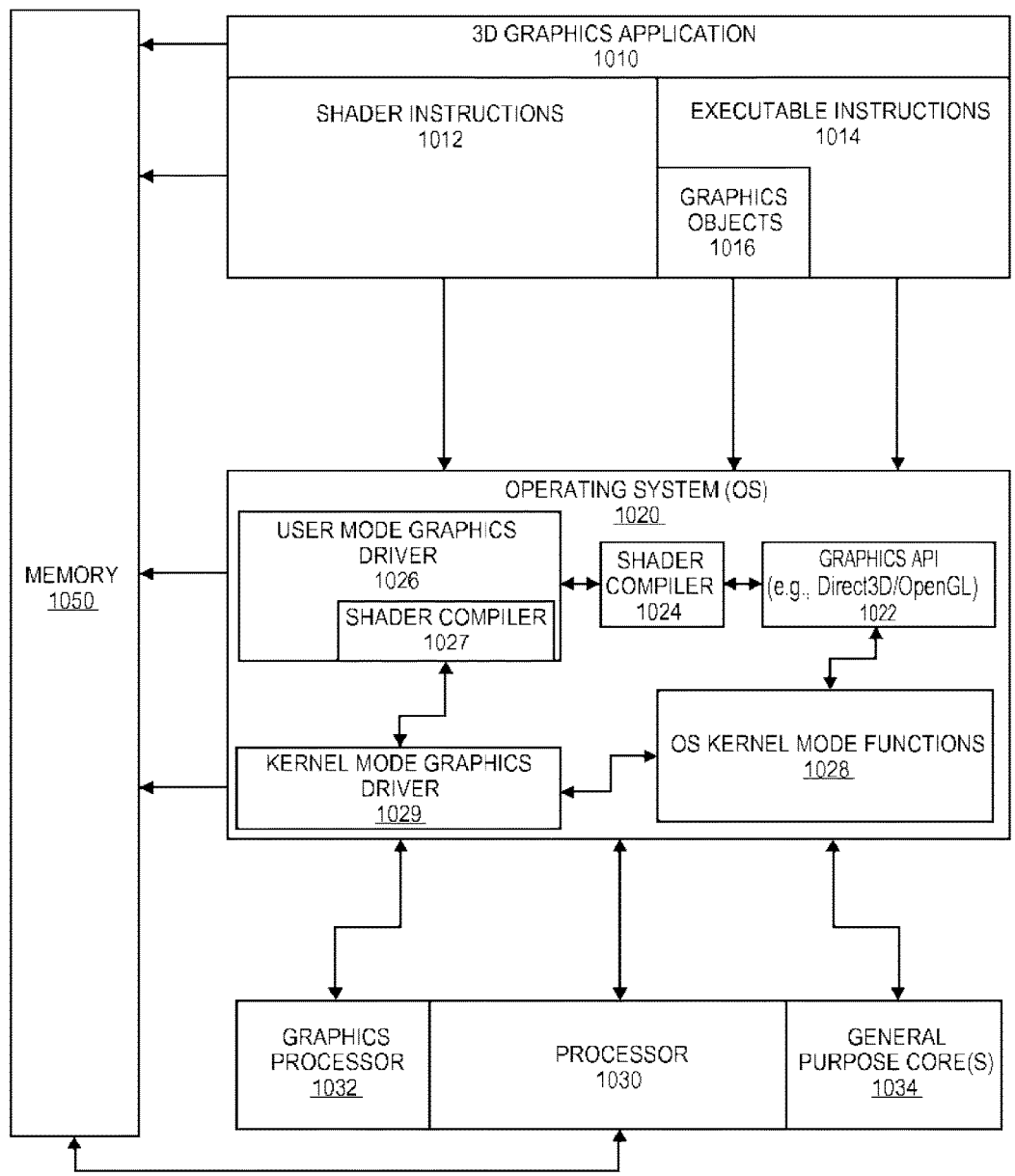
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Figure 11:
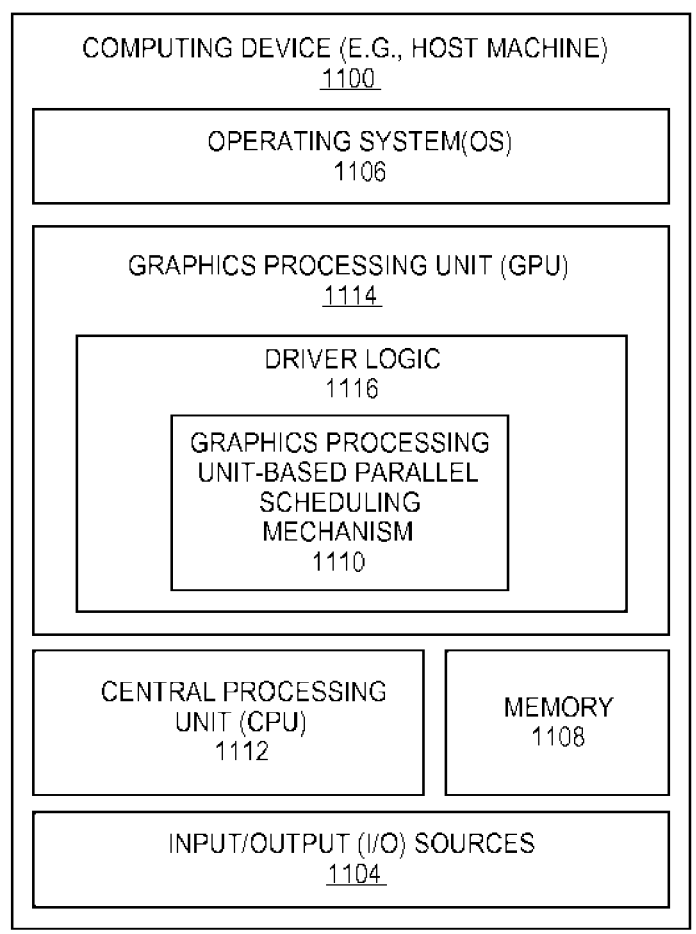
FIG. 11 a computing device employing a graphics processing unit-based parallel scheduling mechanism according to one embodiment.

FIG. 11 illustrates a computing device 1100 employing a graphics processing unit-based parallel scheduling mechanism 1110 according to one embodiment. Computing device 1100 (e.g., mobile computing device) may be the same as data processing system 100 of FIG. 1 and accordingly, for brevity and ease of understanding, many of the details stated above with reference to FIGS. 1-10 are not further discussed or repeated here. Computing device 1100 may include a mobile computing device (e.g., smartphone, tablet computer, laptops, game consoles, portable workstations, etc.) serving as a host machine for hosting a GPU-based parallel scheduling mechanism ("parallel scheduling mechanism") 1110 for facilitating dynamic graphics domain-based parallel scheduling of command packages (also referred to as "command packets", "packets", "packages", or simply "commands"). Parallel scheduling mechanism 1110 may include any number and type of components to perform various tasks to facilitate efficient GPU-based parallel scheduling in various computing devices, such as at GPU 1114 of computing device 1100, as will be further described throughout this document. It is to be noted that throughout this document, the term "graphics domain" may be referenced interchangeably with "graphics processing unit" or simply "GPU" and similarly, "CPU domain" or "host domain" may be referenced interchangeably with "computer processing unit" or simply "CPU".

Computing device 1100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1100 may include mobile computing devices serving as communication devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™ system, etc.), e-readers (e.g., Kindle® by Amazon®, Nook® by Barnes and Nobles®, etc.), smart televisions, television platforms, wearable devices (e.g., watch, bracelet, smartcard, jewelry, clothing items, etc.), media players, etc. For example, in one embodiment, computing device 1100 may include a mobile computing device employing an integrated circuit ("IC"), such as system on a chip ("SoC" or "SOC"), integrating various hardware and/or software components of computing device 1100 on a single chip.

As illustrated, in one embodiment, in addition to employing parallel scheduling mechanism 1110, computing device 1100 may further include any number and type of hardware components and/or software components, such as (but not limited to) CPU 1112, GPU 1114 having graphics driver logic 1116 hosting parallel scheduling mechanism 1110, memory 1108, network devices, drivers, or the like, as well as input/output (I/O) sources 1104, such as touchscreens, touch panels, touch pads, virtual or regular keyboards, virtual or regular mice, ports, connectors, etc. Computing device 1100 may include operating system (OS) 1106 serving as an interface between hardware and/or physical resources of the computer device 1100 and a user. It is contemplated that CPU 1112 may include one or processors, such as processor(s) 102 of FIG. 1, while GPU 1114 may include one or more graphics processors, such as graphics processor(s) 108 of FIG. 1. In one embodiment and as will be further descried with reference to the subsequent figures, parallel scheduling mechanism 1110 may be in communication with its host driver logic 1116 which cooperates with GPU 1114 to facilitate any number and type of tasks facilitating GPU-based parallel scheduling of commands as is described through this document.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-10, some processes of the graphics pipeline as described above are implemented in software, while the rest are implemented in hardware. A graphics pipeline may be implemented in a graphics coprocessor design, where CPU 1112 is designed to work with GPU 1114 which may be included in or co-located with CPU 1112. In one embodiment, GPU 1114 may employ any number and type of conventional software and hardware logic to perform the conventional functions relating to graphics rendering as well as novel software and hardware logic to execute any number and type of instructions, such as instructions 121 of FIG. 1, to perform the various novel functions of parallel scheduling mechanism 1110 as disclosed throughout this document.

As aforementioned, memory 1108 may include a random access memory (RAM) comprising application database having object information. A memory controller hub, such as memory controller hub 116 of FIG. 1, may access data in the RAM and forward it to GPU 1114 for graphics pipeline processing. RAM may include double data rate RAM (DDR RAM), extended data output RAM (EDO RAM), etc. CPU 1112 interacts with a hardware graphics pipeline, as illustrated with reference to FIG. 3, to share graphics pipelining functionality. Processed data is stored in a buffer in the hardware graphics pipeline, and state information is stored in memory 1108. The resulting image is then transferred to a display component or device, such as display device 320 of FIG. 3, for displaying. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1108 may comprise a pre-allocated region of a buffer (e.g., frame buffer); however, it should be understood by one of ordinary skill in the art that the embodiments are not so limited, and that any memory accessible to the lower graphics pipeline may be used. Computing device 1100 may further include input/output (I/O) control hub (ICH) 130 as referenced in FIG. 1, one or more I/O devices, etc.

CPU 1112 may include one or more processors to execute instructions in order to perform whatever software routines the computing system implements. The instructions frequently involve some sort of operation performed upon data. Both data and instructions may be stored in system memory 1108 and any associated cache. Cache is typically designed to have shorter latency times than system memory 1108; for example, cache might be integrated onto the same silicon chip(s) as the processor(s) and/or constructed with faster static RAM (SRAM) cells whilst the system memory 1108 might be constructed with slower dynamic RAM (DRAM) cells. By tending to store more frequently used instructions and data in the cache as opposed to the system memory 1108, the overall performance efficiency of computing device 1100 improves. It is contemplated that in some embodiments, GPU 1114 may exist as part of CPU 1112 (such as part of a physical CPU package) in which case, memory 1108 may be shared by CPU 1112 and GPU 1114 or kept separated.

System memory 1108 may be made available to other components within the computing device 1100. For example, any data (e.g., input graphics data) received from various interfaces to the computing device 1100 (e.g., keyboard and mouse, printer port, Local Area Network (LAN) port, modem port, etc.) or retrieved from an internal storage element of the computer device 1100 (e.g., hard disk drive) are often temporarily queued into system memory 1108 prior to their being operated upon by the one or more processor(s) in the implementation of a software program. Similarly, data that a software program determines should be sent from the computing device 1100 to an outside entity through one of the computing system interfaces, or stored into an internal storage element, is often temporarily queued in system memory 1108 prior to its being transmitted or stored.

Further, for example, an ICH, such as ICH 130 of FIG. 1, may be used for ensuring that such data is properly passed between the system memory 1108 and its appropriate corresponding computing system interface (and internal storage device if the computing system is so designed) and may have bi-directional point-to-point links between itself and the observed I/O devices. Similarly, an MCH, such as MCH 116 of FIG. 1, may be used for managing the various contending requests for system memory 1108 accesses amongst CPU 1112 and GPU 1114, interfaces and internal storage elements that may proximately arise in time with respect to one another.

I/O sources 1104 may include one or more I/O devices that are implemented for transferring data to and/or from computing device 1100 (e.g., a networking adapter); or, for a large scale non-volatile storage within computing device 1100 (e.g., hard disk drive). User input device, including alphanumeric and other keys, may be used to communicate information and command selections to GPU 1114. Another type of user input device is cursor control, such as a mouse, a trackball, a touchscreen, a touchpad, or cursor direction keys to communicate direction information and command selections to GPU 1114 and to control cursor movement on the display device. Camera and microphone arrays of computer device 1100 may be employed to observe gestures, record audio and video and to receive and transmit visual and audio commands.

Computing device 1100 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1100 may vary from implementation to implementation depending upon numerous factors, such as price constraints, performance requirements, technological improvements, or other circumstances. Examples of the electronic device or computer system 1100 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 12A:
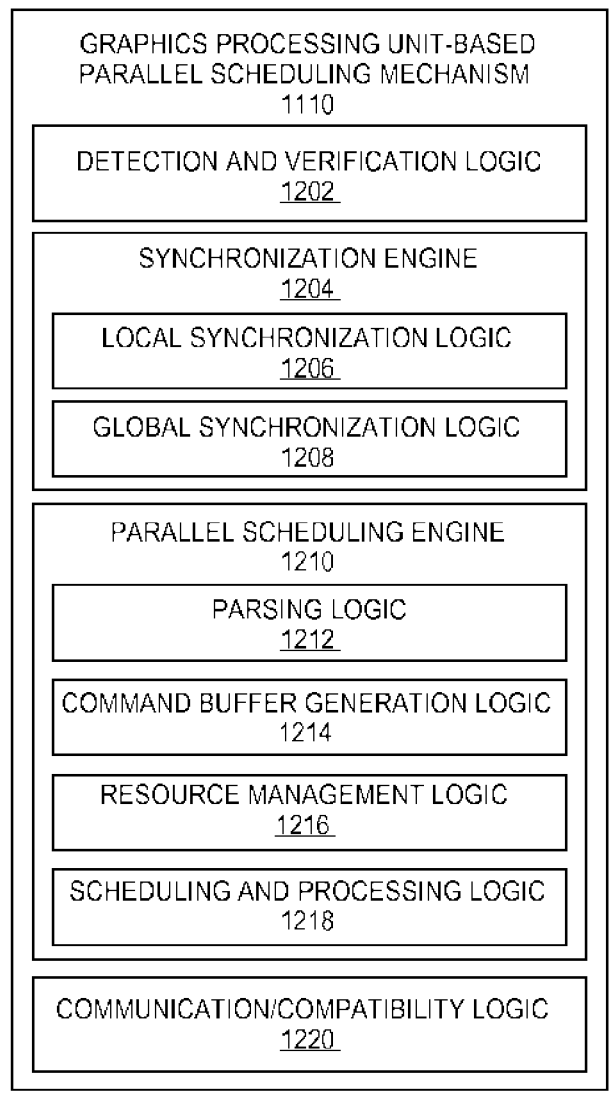
FIG. 12A illustrates a graphics processing unit-based parallel scheduling mechanism according to one embodiment.

FIG. 12A illustrates a graphics processing unit-based parallel scheduling mechanism 1110 according to one embodiment. In one embodiment, parallel scheduling mechanism 1110 may include any number and type of components to perform various tasks relating to facilitating GPU-based parallel scheduling of command packages at a computing device, such as computing device 1100 of FIG. 11. For example and in one embodiment, parallel scheduling mechanism 1110 may include (but not limited to): detection and verification logic 1202; synchronization engine 1204 including local synchronization logic 1206 and global synchronization logic 1208; parallel scheduling engine 1210 including parsing logic 1212, command buffer generation logic 1214, resource management logic 1216, and scheduling and processing logic 1218; and communication/compatibility logic 1220. It is further illustrated and as aforementioned with reference to FIG. 11, parallel scheduling mechanism 1110 may be part of driver logic 1116 which cooperates with GPU 1114 which in turn facilitates performance of one or more tasks relating to GPU-based parallel scheduling.

In one embodiment, detection and verification logic 1202 is used to detect and/or verify each new (or stored) command, such as commands 1252A-1252N of FIG. 12B, that is added by a kernel, such as a child kernel. It is contemplated a new command may be a previously stored command that is now ready for processing and accordingly, detection and verification logic 1202 may also be used to detect and/or verify one or more events and/or their event status where the events are to be handled prior to processing the corresponding commands as further described with reference to FIG. 13B.

Upon detection and/or verification of events, new/stored commands, etc., in one embodiment, synchronization engine 1204 is triggered to facilitate synchronization processes relating to various components, such as GPU hardware threads, as illustrated with reference to FIG. 13B. Further, for example, synchronization engine 1204 may include local synchronization logic 1206 to facilitate synchronization within each workgroup, such as by triggering barrier function calls as may be directly supported by the hardware, and global synchronization logic 1208 to facilitate synchronization across multiple workgroups without having to employ a dedicated hardware asset as further illustrated with reference to FIG. 13C.

In one embodiment, parsing logic 1212 of parallel scheduling engine 1210 may be used for parsing contents of queue buffers and working with command buffer generation logic 1214 for generating GPU command buffers, such as command buffers 1256A-1256N of FIG. 12B, as further described with reference to FIGS. 13B and 13E. For example, parsing of contents may include checking to determine whether a command is valid and then, further checking to determine if all the event dependencies for the command are met because if such event dependencies are not met, the command may not be processed at the moment.

Moreover, in one embodiment, resource management logic 1216 may be used to ensure that necessary resources are timely and sufficiently acquired and distributed and even relinquished to facilitate an efficient and seamless parallel scheduling of commands. For example and as illustrated with reference to FIG. 13D, any number and type of resources may be needed when workloads are executed on GPU 1114, where such resources may include (but not limited to) executable code, buffer and images, heaps, command buffers, etc.

In one embodiment, resource management logic 1216 facilitates acquisition of all the necessary resources and subsequently, performs distribution and assignment of these resources across multiple client kernel calls, such as a command buffer space may be acquired for a command then appropriately (such in terms of its size, timeliness, etc.) assigned to the command so that the command may be seamless, and in runtime, processed in parallel with other commands associated with other command buffers. Further, in one embodiment, the processing of any number and type of commands and the dispatching of data associated with such commands may be facilitated by scheduling and processing logic 1218.

Communication/compatibility logic 1220 may be used to facilitate dynamic communication and compatibility between one or more computing devices, such as computing device 1100 of FIG. 11, and any number and type of other computing devices (such as mobile computing device, desktop computer, server computing device, etc.), processing devices (such as central processing unit (CPU), graphics processing unit (GPU), etc.), image capturing devices (such as camera), display elements (such as display component, display device, display screen, etc.), user/context-awareness components and/or identification/verification sensors/devices (such as biometric sensor/detector, scanner, etc.), memory or storage devices, databases and/or data sources (such as data storage device, hard drive, solid-state drive, hard disk, memory card or device, memory circuit, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, such as Facebook®, LinkedIn®, Google+®, Twitter®, etc., business applications, games and other entertainment applications, etc.), programming languages, etc., while ensuring compatibility with changing technologies, parameters, protocols, standards, etc.

Throughout this document, terms like "logic", "component", "module", "framework", "engine", and the like, may be referenced interchangeably and include, by way of example, software, hardware, and/or any combination of software and hardware, such as firmware. Further, any use of a particular brand, word, term, phrase, name, and/or acronym, such as "GPU", "GPU domain", "CPU", "CPU domain", "thread", "buffer", "command", "parallel", "scheduling", "nested parallelism", "synchronization", "OpenCL™", "kernel", "barrier", etc., should not be read to limit embodiments to software or devices that carry that label in products or in literature external to this document.

It is contemplated that any number and type of components may be added to and/or removed from parallel scheduling mechanism 1110 to facilitate various embodiments including adding, removing, and/or enhancing certain features. For brevity, clarity, and ease of understanding of parallel scheduling mechanism 1110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 12B illustrates a transaction sequence for dynamic command buffer creation as facilitated by a parallel scheduling mechanism 1110 of FIG. 12A. In one embodiment, driver logic 1116 of GPU 1114 of FIG. 11 may be adjusted for a GPU friendly environment by having driver logic 1116 host parallel scheduling mechanism 1110 which functions as parallel scheduler to support driver code GPU architecture. For example, using OpenCL™, parallel work may be divided into any number of local workgroups sharing local memory, where each workgroup may contain a fixed number of work items, having dedicated work item identifications ("ids") obtained by one or more local functions (e.g., get_local_id) and/or one or more global functions (e.g., get_global_id) such that parallelism is achieved by creating algorithms working on multiple work items sharing data across local workgroups.

In one embodiment, one or more dedicated mechanisms may be provided for facilitating writing parallel codes, such as a shared local memory, which may be a part of L3 cache that can be used directly in, for example, OpenCL kernels. Similarly, for example, parallel scheduling mechanism 1110 includes synchronization engine 1204 for synchronization across multiple hardware threads 1254A-1254N within a workgroup (as is further achieved and supported by barrier function calls). Moreover, one or more commands, such as GPGPU_WALKER, may be used to spawn multiple hardware threads 1254A-1254N across multiple GPU execution units.

In conventional techniques, only a single conventional CPU thread is used which is responsible for processing one command at a time and thus to service this command, a sequential driver is employed which is unable to accept a new command until all the old/pending commands preceding the new command are fully processed and dispatched.

In contrast, as illustrated, in one embodiment, several commands 1252A-1252N may be dispatched simultaneously or in parallel using multiple GPU-based threads 1254A-1254N as facilitated by various components of parallel scheduling mechanism 1110 as further described with reference to FIG. 12A and FIGS. 13A-E. It is contemplated that multiple work items form local work groups, where multiple work groups form the total execution domain. In one embodiment, a large command buffer may be generated such that any number of command information dispatches 1256A-1256N may be generated in parallel and as parts of this large command buffer. For example, in the illustrated embodiment, multiple GPU threads 1254A-1254N are selected to be used in parallel for commands 1252A-1252N and further, command information dispatches 1256A-1256N are created in parallel, where each thread, such as GPU thread 6 1254N, may use its own dedicated space for writing and processing a new command, such as command 6 1252N, without having to wait for the end of processing of any of the other prior commands, such as commands 1-5 1252A-1252E, which may continue to be processed in parallel, while the new command 6 1252N is scheduled and accepted for new processing. Stated differently, this means the total time need for GPU command buffer creation is divided by the number of available threads, such as threads 1254A-1254N corresponding to command information dispatch 1256A-1256N, which significantly lowers the processing time and consequently, the use of other system resources, such as power, memory, etc.

Figure 13A:
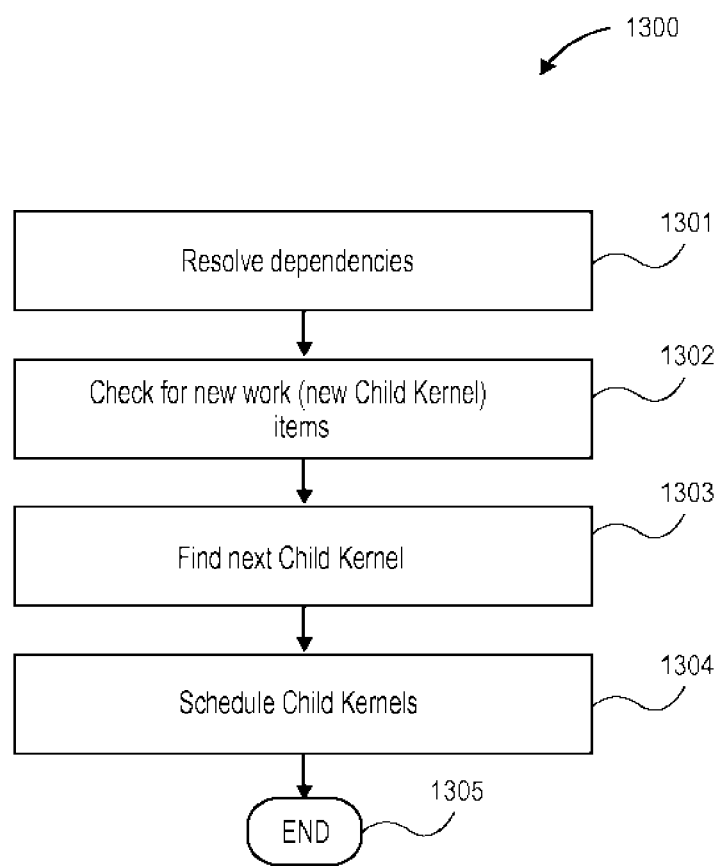
FIG. 13A illustrates a method for graphics processing unit-based parallel scheduling as facilitated by a parallel scheduling mechanism of FIG. 12A.

FIG. 13A illustrates a method 1300 for graphics processing unit-based parallel scheduling as facilitated by a parallel scheduling mechanism 1110 of FIG. 12A. Method 1300 may be performed by processing logic that may comprise hardware (e.g., circuitry, dedicated logic, programmable logic, etc.), software (such as instructions run on a processing device), or a combination thereof. In one embodiment, method 1300 may be performed by parallel scheduling mechanism 1110 of FIG. 12A. The processes of method 1300 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

Method 1300, as illustrated, begins at block 1301 with resolving of dependencies, such as checking for status of any events that need to be resolved prior to processing any commands and further, checking to determine any commands that have been completed with their processing as further illustrated with reference to FIG. 13B. The process continues at block 1302 with checking to determine whether any new work/commands have been added, such as checking for any new child kernels that have been added to the queue buffer. At block 1303, next kernels are found, such as by browsing an internal structure to determine whether one or more child kernels are ready for execution. At block 1304, the commands are scheduled and dispatched for processing via their corresponding command buffers, such as child kernels are scheduled and processed as corresponding states are prepared for them. At block 1305, the process ends with the end of processing of any pending jobs/commands and in the absence of any new jobs/commands. However, it is contemplated that the process may continue if a new job/command is detected.

Figure 13B:
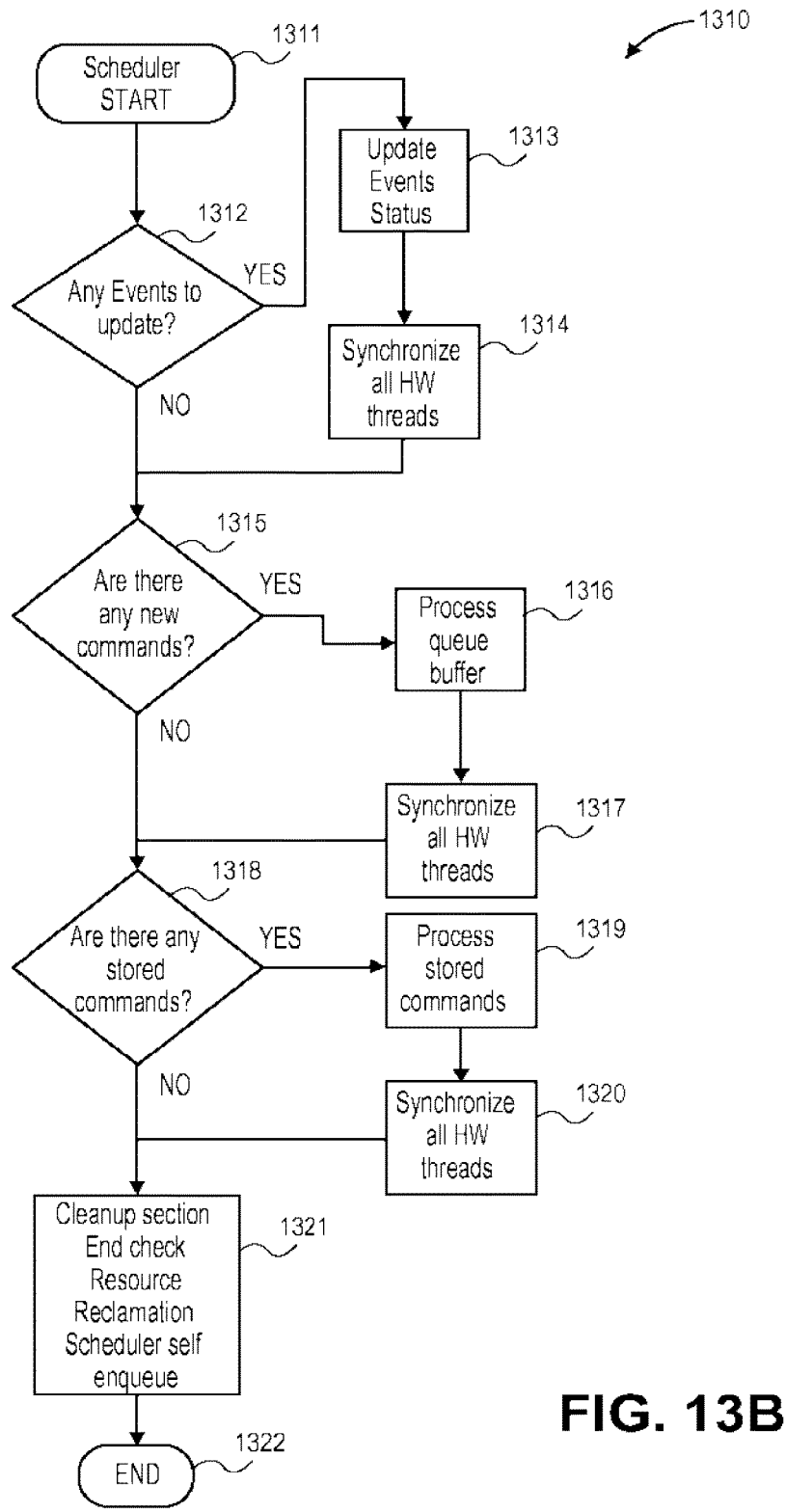
FIG. 13B illustrates a method for graphics processing unit-based parallel scheduling as facilitated by a parallel scheduling mechanism of FIG. 12A.

FIG. 13B illustrates a method 1310 for graphics processing unit-based parallel scheduling as facilitated by a parallel scheduling mechanism 1110 of FIG. 12A. Method 1310 may be performed by processing logic that may comprise hardware (e.g., circuitry, dedicated logic, programmable logic, etc.), software (such as instructions run on a processing device), or a combination thereof. In one embodiment, method 1310 may be performed by parallel scheduling mechanism 1110 of FIG. 12A. The processes of method 1310 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

Method 1310 begins at block 1311 with initiation of a parallel scheduling process. At block 1312, a determination is made as to whether there are events that are to be updated. For example, each command may be synchronized with the usage of any corresponding events, where each command may return an event, its reflecting execution status, and each event may be passed as an input when scheduling another command. Stated differently, until a given event is completed, its corresponding command may not be regarded as completed and all commands waiting for completion of this event may not be ready to run. Accordingly, in one embodiment, if there are any events to update, their event status are updated at block 1313 and all the corresponding GPU hardware threads are synchronized at block 1314. Upon synchronizing the hardware threads at block 1314 or, on the other hand, if there are no events to update, the process continues at block 1315 where a determination is made as to whether there are any new commands ready for processing.

It is contemplated that a new command in 1315 may include a command that is newly added by child kernels. In one embodiment, at block 1315, a check is performed for any new commands on queue buffer and if there are any new commands, at block 1316, they are processed here at queue buffer, which means a check for event dependencies is performed and if no event dependencies exist or they are deemed to have been resolved, then a command buffer is generated for those commands. In contrast, if event dependencies exist and are not met and/or sufficient resources are not available, the command is moved to the storage. Accordingly, if there is a new command added and its event dependencies are met, then all the necessary and/or relevant resources (e.g., executable code, buffer and images, memory heaps, command buffers, etc.) are acquired and a command buffer is created and all the corresponding GPU hardware threads are synchronized at block 1317. Upon synchronizing the hardware threads at block 1317 or, on the other hand, if there are no new commands, the process continues at block 1318 where a determination is made as to whether there are any stored commands that are ready for processing.

As aforementioned, there may be commands that are not regarded as purely new but that they were previously new and then stored for later processing for any number and type of reasons, such as their events has to be updated or completed before the commands can be processed and accordingly, such stored commands, at one point, may be ready for processing when the relevant reasons have been addressed, such as the corresponding events have been completed. Stated differently, in one embodiment, in situations when a new command may not be ready to run (such as when it depends on another base/parent command whose processing is yet to be completed or due to lack of enough resources to schedule the new command right away, etc.), the new command in those situations may be moved to a storage medium and stored there to be parsed and processed later (such as when the base command has been processed or enough resources have been made available, etc.).

In one embodiment, if there are any stored commands that are ready for processing, then, at block 1319, those commands are obtained from the storage (e.g., database or other storage medium) and sent to their corresponding command buffer to be processed and all the corresponding GPU hardware threads are synchronized at block 1320. Upon synchronizing the hardware threads at block 1320 or, on the other hand, if there are no stored commands to be processed, the process continues at block 1321 with a cleanup section end check, such as reclamation, scheduler self-enqueing, etc., and the process then ends at block 1322. It is further contemplated that those commands being stored in the storage may also have to be checked for event dependencies and resource availability before they can be processed.

Figure 13C:
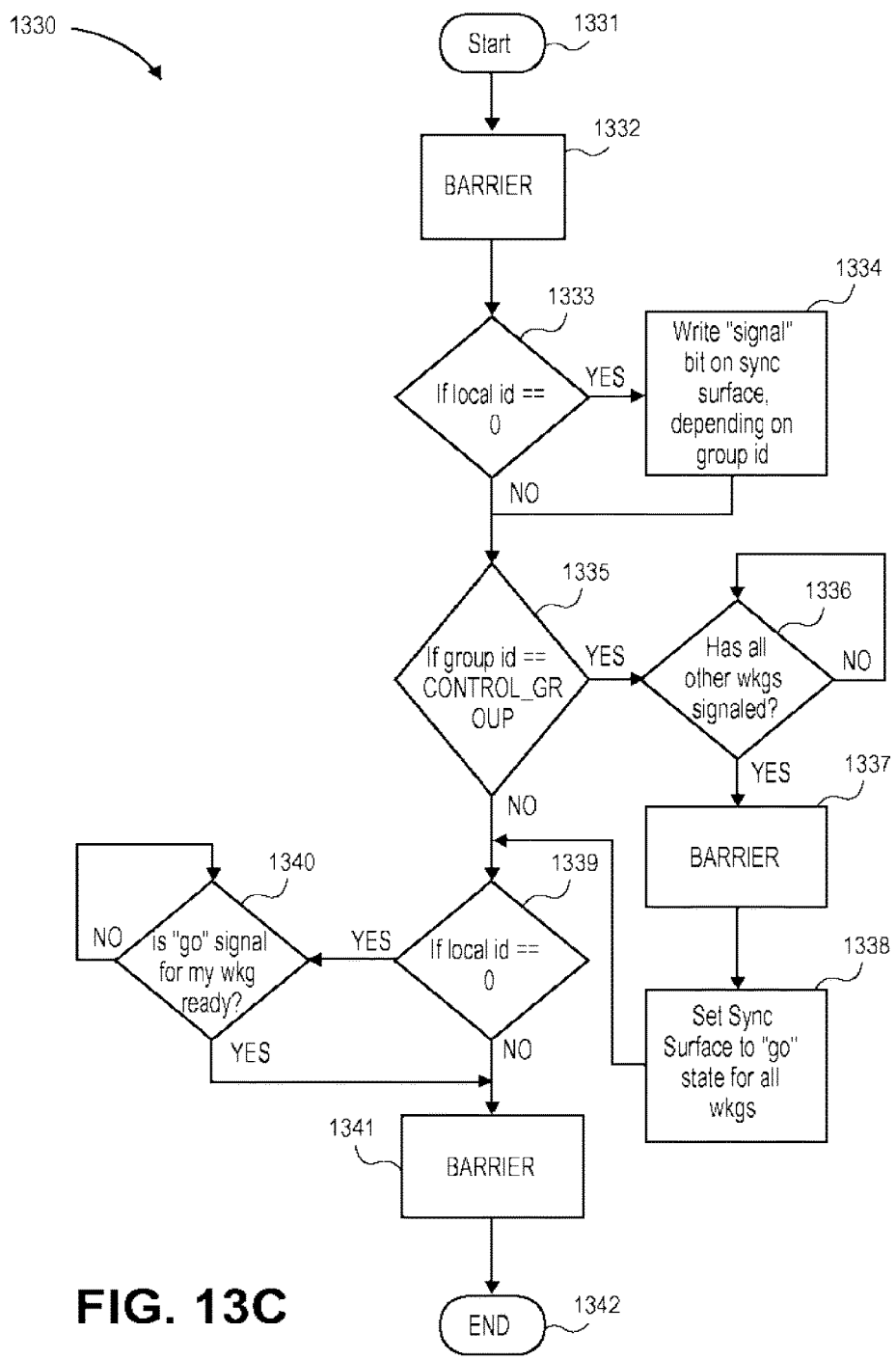
FIG. 13C illustrates a method for graphics processing unit-based parallel scheduling including synchronization of hardware threads as facilitated by a parallel scheduling mechanism of FIG. 12A.

FIG. 13C illustrates a method 1330 for graphics processing unit-based parallel scheduling including synchronization of hardware threads as facilitated by a parallel scheduling mechanism 1110 of FIG. 12A. Method 1330 may be performed by processing logic that may comprise hardware (e.g., circuitry, dedicated logic, programmable logic, etc.), software (such as instructions run on a processing device), or a combination thereof. In one embodiment, method 1330 may be performed by parallel scheduling mechanism 1110 of FIG. 12A. The processes of method 1330 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

As aforementioned with respect to FIG. 12A, synchronization of hardware threads may be performed locally, such as within each workgroup, which may be achieved by a barrier function call (or simply "barrier") and as may be directly supported by an existing hardware of a computing device. In one embodiment, synchronization of hardware threads may also be performed globally, such as across multiple workgroups, which may be achieved without any need for a new hardware asset and using one or more of the processes of method 1330. Method 1330 begins with the start of a process at block 1331 where all the hardware threads (e.g., GPU hardware threads) may need to hit a barrier before proceeding with any workgroup signals at block 1332.

At block 1333, in one embodiment, a determination is made as to whether a local id equals zero, 0. If yes, the local id does equal 0, at block 1334, the process continues with writing a signal bit on a synchronization surface, depending on a group id (e.g., get_group_id). For example and in one embodiment, one work item may write a signal state that reflects this workgroup having hit a global synchronization point, where synchronization surface may have a separate space for each workgroup to write the signal state. Once the process of block 1334 is completed or if the local id does not equal 0, the process continues at block 1335 where a determination is made as to whether a group id equals a controlling or control workgroup (e.g., CONTROL_GROUP). For example, there may be a dedicated workgroup that waits until all other workgroups have written their signal mark.

If yes, the group id equals control_group, another determination is made as to whether all other workgroups have been signaled at block 1336. If not signaled, the process continues in a loop through block 1336 to continue to determine whether all other workgroups have been signaled. If yes, all other workgroups have been signaled, a barrier is triggered at block 1337 and synchronization is set to go state for all workgroups at block 1338. For example and in one embodiment, when a control workgroup detects that all other workgroups have put a signal state, it may change all states to go state, which may mean that all workgroups are synchronized and may proceed for further processing.

Once the synchronization surface is set to go state for all workgroups at block 1338 or, referring back to block 1335, if the group id does not equal control_group, the process may continue with another determination as to whether a local id equals 0 at block 1339. If the local id does not equal 0, another barrier is triggered at block 1341 and the process ends at block 1342. For example and in one embodiment, if all hardware threads within their workgroups hit this barrier, it may mean that the process of synchronization has completed and ended. If, however, the local id equals 0, the process may continue at block 1340 with another determination as to whether a workgroup signal is ready for the process to continue. For example and in one embodiment, all workgroups may wait until the control group changes the dedicated state this workgroup from signaled to go. If the state is not ready or not a go or still remains signaled, the process may continue in a loop through block 1340. If, on the other hand, the state has changed to a go, the process may continue with another barrier being triggered at block 1341 and the process ends at block 1342. In one embodiment, a workgroup may contain multiple work items with each having a separate local id. Further, a barrier function may synchronize all work items within the workgroup, which means whenever the barrier is hit by a work item, then the hardware may make sure that this particular work item does not proceed further unless all other work items within the workgroup have also hit the barrier. In other words, for example, if only one work item with local id 0 is waiting in the loop, then all other work items may also be waiting on the barrier for this work item before proceeding.

Figure 13D:
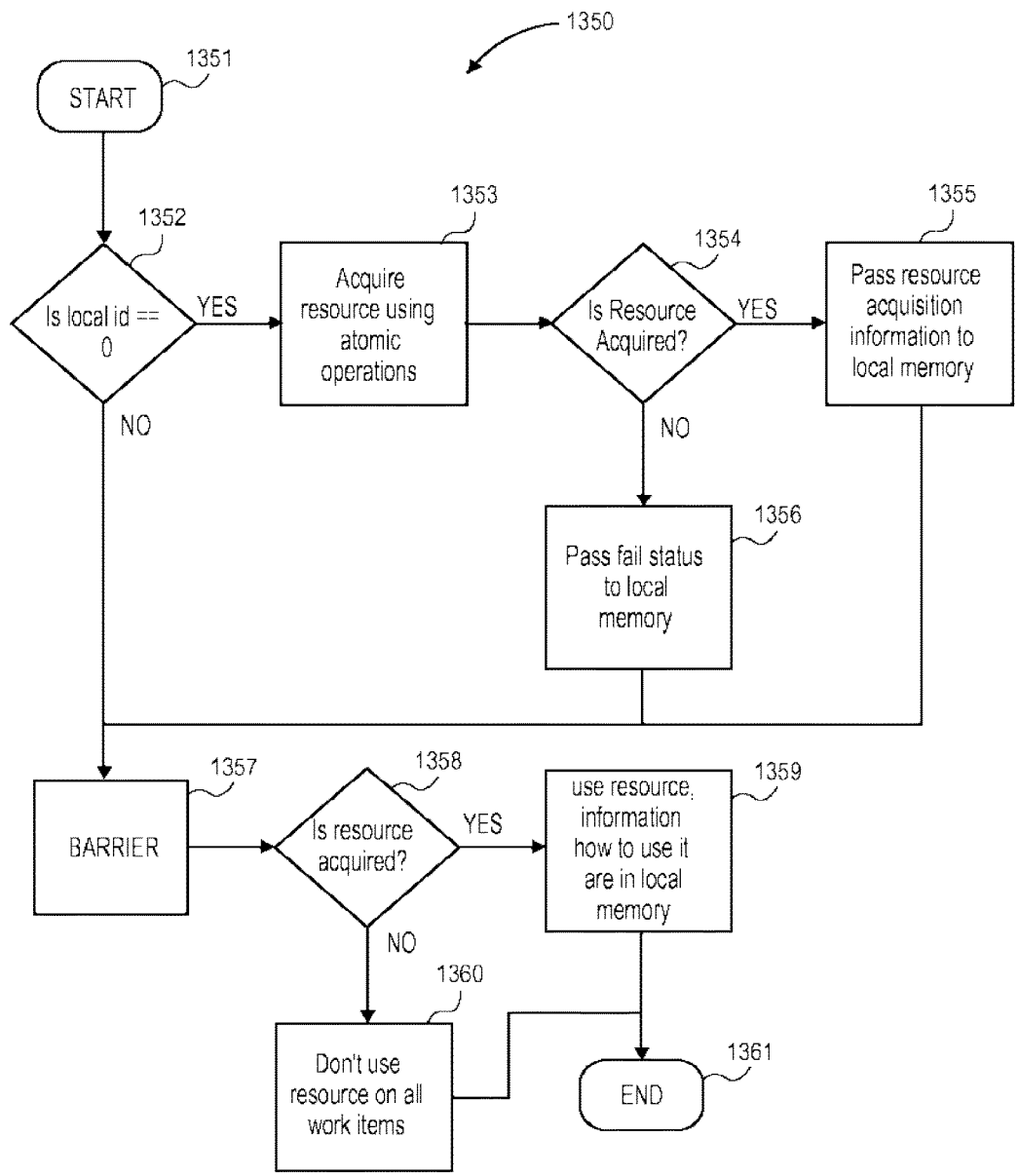
FIG. 13D illustrates a method for graphics processing unit-based parallel scheduling including a process for resource acquisition as facilitated by a parallel scheduling mechanism of FIG. 12A.

FIG. 13D illustrates a method 1350 for graphics processing unit-based parallel scheduling including a process for resource acquisition as facilitated by a parallel scheduling mechanism 1110 of FIG. 12A. Method 1350 may be performed by processing logic that may comprise hardware (e.g., circuitry, dedicated logic, programmable logic, etc.), software (such as instructions run on a processing device), or a combination thereof. In one embodiment, method 1350 may be performed by parallel scheduling mechanism 1110 of FIG. 12A. The processes of method 1350 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

In one embodiment, driver logic of a GPU, such as driver logic of 1116 of GPU 1114 of FIG. 12A, may need to have acquisition and release of resources so that a seamless and dynamic parallel scheduling of commands/workloads may be performed on the GPU. For example, as aforementioned, these resources may include any number and type of components, such as (but not limited to) execution code, buffers and images, heaps, command buffers, etc. Method 1350, in one embodiment, provides for a number of processes to facilitate the acquisition, distribution, and/or relinquishment of any number and type of resources over multiple client kernel calls to facilitate the GPU-based parallel scheduling of commands.

Method 1350 begins at block 1351 with an initiation for a process for resource acquisition and distribution. At block 1352, a determination is made as to whether a local id equals zero, 0. If the local id equals 0, any number and type of resources may be acquired using atomic operations at block 1353. At block 1354, another determination is made as to whether the resources have been acquired. For example and in one embodiment, all other work items of a workgroup may be waiting on a barrier for results of the operation of block 1353. If the resources are successfully acquired, any information relating to the acquired resources is forwarded on to a local memory at block 1355. The information may identify the acquired resources and include data relating to how the acquired resources are to be used, etc. If, however, the resources are not acquired, a fail status is forwarded on to the local memory at block 1356.

In one embodiment, after completing either of the processes of blocks 1355 and 1356 or, referring back to block 1352, if the local id equals 0, a barrier is trigged and encountered at block 1357. This barrier ensures that all work items from the workgroup have updated information in the local memory. Upon encountering the barrier, another determination is made as to whether the resources have been acquired at block 1358. If the resources have been acquired, the acquired resources are then distributed and used based on the updated information at the local memory at block 1359 and subsequently, the process ends at block 1361. On the other hand, if the resources are not acquired, the resources are not used on any of the work items of the work at block 1360 and subsequently, the process ends at block 1361.

Figure 13E:
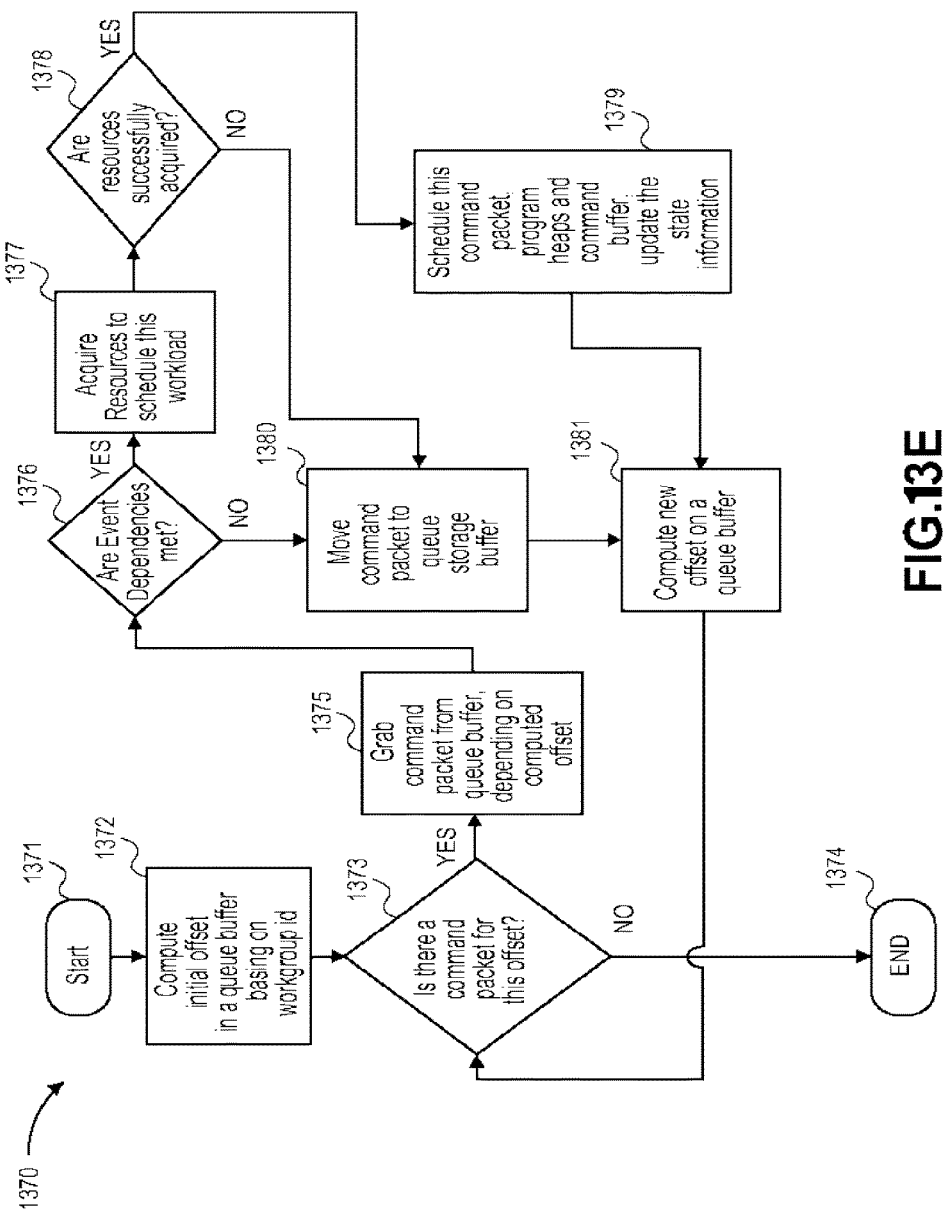
FIG. 13E illustrates a method for graphics processing unit-based parallel scheduling including a process for queue buffer parsing as facilitated by a parallel scheduling mechanism of FIG. 12A.

FIG. 13E illustrates a method 1370 for graphics processing unit-based parallel scheduling including a process for queue buffer parsing as facilitated by a parallel scheduling mechanism 1110 of FIG. 12A. Method 1370 may be performed by processing logic that may comprise hardware (e.g., circuitry, dedicated logic, programmable logic, etc.), software (such as instructions run on a processing device), or a combination thereof. In one embodiment, method 1370 may be performed by parallel scheduling mechanism 1110 of FIG. 12A. The processes of method 1370 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

Method 1370 may begin at block 1371 with initiation of a process for parsing queue buffers. In one embodiment, new command packets may reside in queue buffers where the buffers are parsed using GPU threads as provide in various processes of method 1370. In one embodiment, at block 1372, an initial offset is computed for a queue buffer based on a workgroup id. At block 1373, a determination is made as to whether there is a command for its corresponding computed initial offset. If there is no command corresponding to the offset, the process may end at block 1374. In one embodiment, if there is command corresponding to the initial offset, the command is obtained depending on the computed offset at block 1375.

In one embodiment, the process continues at block 1376 where a determination is made as to whether all event dependencies are met for the command. If the event dependences are met, any necessary and/or relevant resources are acquired and the command/workload is scheduled for processing at block 1377. The process continues with block 1378 where another determination is made as to whether the aforementioned resources are successfully acquired. If the resources are successfully acquired, at block 1379, the process may continue with scheduling of the command and programming of heaps and command buffers, and updating of the relevant state information. The process may then continue with computing a new offset on a command buffer at block 1381 and then on to with block 1373. Similarly, in one embodiment, referring back to blocks 1376 and 1378, if the event dependences are not met or the necessary resources have not been acquired, the command may be moved to a queue storage buffer where it is stored for future processing at block 1380 and a new offset is computed at block 1381. The process may then continue at block 1373. In one embodiment, one or more of processes 1377, 1379, and 1381 indicate that a workgroup synchronization has occurred.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate parallel scheduling of multiple commands on computing devices, comprising: detection and verification logic to detect a command of a plurality of commands to be processed at a graphics processing unit (GPU); resource management logic to acquire one or more resources of a plurality of resources to process the command, wherein the plurality of resources include other resources being used to process other commands of the plurality of commands; and scheduling and processing logic to facilitate processing of the command using the one or more resources, wherein the command is processed in parallel with processing of the other commands using the other resources.

Example 2 includes the subject matter of Example 1, further comprising: command buffer generation logic to generate a command buffer corresponding to the command, and wherein the plurality of resources comprise one or more of GPU hardware threads, command buffers, executable code, and memory heaps.

Example 3 includes the subject matter of Example for 2, wherein the command is processed via a GPU hardware thread, and wherein the scheduling and processing logic is further to facilitate dispatching of data relating to the processed command via the command buffer.

Example 4 includes the subject matter of Example 1, further comprising global synchronization logic to synchronize the plurality of GPU hardware threads over a plurality of workgroups, wherein each workgroup includes two or more of the plurality of GPU hardware threads processing in parallel with two or more of the plurality of commands.

Example 5 includes the subject matter of Example 1, further comprising: parsing logic to parse a command queue to detect one or more dependency events that are to be satisfied before the command sent for processing.

Example 6 includes the subject matter of Example 5, wherein, if the one or more dependency events are detected, the scheduling and processing logic to delay the processing of the command and store the command at a storage medium.

Example 7 includes the subject matter of Example 5, wherein, if the one or more dependency events are not detected, the scheduling and processing logic to schedule the processing of the command without delays.

Example 8 includes the subject matter of Example 5 or 7, wherein the command is re-scheduled, via the scheduling and processing logic, to be processed upon satisfaction of the one or more dependency events, wherein the one or more dependency events include at least one of incompletion of processing of a parent command and unavailability of a resource of the plurality of resources.

Example 9 includes the subject matter of Example 8, wherein the parent command represents a base command upon which the command is dependent, and wherein the unavailable resource includes an essential resource for processing of the command.

Some embodiments pertain to Example 10 that includes a method for facilitating parallel scheduling of multiple commands on computing devices, comprising: detecting a command of a plurality of commands to be processed at a graphics processing unit (GPU); acquiring one or more resources of a plurality of resources to process the command, wherein the plurality of resources include other resources being used to process other commands of the plurality of commands; and facilitating processing of the command using the one or more resources, wherein the command is processed in parallel with processing of the other commands using the other resources.

Example 11 includes the subject matter of Example 10, further comprising: generating a command buffer corresponding to the command, and wherein the plurality of resources comprise one or more of GPU hardware threads, command buffers, executable code, and memory heaps.

Example 12 includes the subject matter of Example 10 or 11, wherein the command is processed via a GPU hardware thread, and wherein the method further comprises facilitating dispatching of data relating to the processed command via the command buffer.

Example 13 includes the subject matter of Example 10, further comprising: synchronizing the plurality of GPU hardware threads over a plurality of workgroups, wherein each workgroup includes two or more of the plurality of GPU hardware threads processing in parallel with two or more of the plurality of commands.

Example 14 includes the subject matter of Example 10, further comprising: parsing a command queue to detect one or more dependency events that are to be satisfied before the command sent for processing.

Example 15 includes the subject matter of Example 14, wherein, if the one or more dependency events are detected, the scheduling and processing logic to delay the processing of the command and store the command at a storage medium.

Example 16 includes the subject matter of Example 14, wherein, if the one or more dependency events are not detected, the scheduling and processing logic to schedule the processing of the command without delays.

Example 17 includes the subject matter of Example 14 or 16, wherein the command is re-scheduled to be processed upon satisfaction of the one or more dependency events, wherein the one or more dependency events include at least one of incompletion of processing of a parent command and unavailability of a resource of the plurality of resources.

Example 18 includes the subject matter of Example 17, wherein the parent command represents a base command upon which the command is dependent, and wherein the unavailable resource includes an essential for processing of the command.

Example 19 includes at least one machine-readable medium comprising a plurality of instructions, when executed on a computing device, to implement or perform a method or realize an apparatus as claimed in any preceding claims.

Example 20 includes at least one non-transitory or tangible machine-readable medium comprising a plurality of instructions, when executed on a computing device, to implement or perform a method or realize an apparatus as claimed in any preceding claims.

Example 21 includes a system comprising a mechanism to implement or perform a method or realize an apparatus as claimed in any preceding claims.

Example 22 includes an apparatus comprising means to perform a method as claimed in any preceding claims.

Example 23 includes a computing device arranged to implement or perform a method or realize an apparatus as claimed in any preceding claims.

Example 24 includes a communications device arranged to implement or perform a method or realize an apparatus as claimed in any preceding claims.

Some embodiments pertain to Example 25 includes a system comprising a storage device having instructions, and a processor to execute the instructions to facilitate a mechanism to perform one or more operations comprising: detecting a command of a plurality of commands to be processed at a graphics processing unit (GPU); acquiring one or more resources of a plurality of resources to process the command, wherein the plurality of resources include other resources being used to process other commands of the plurality of commands; and facilitating processing of the command using the one or more resources, wherein the command is processed in parallel with processing of the other commands using the other resources.

Example 26 includes the subject matter of Example 25, wherein the one or more operations further comprise: generating a command buffer corresponding to the command, and wherein the plurality of resources comprise one or more of GPU hardware threads, command buffers, executable code, and memory heaps.

Example 27 includes the subject matter of Example 25 or 26, wherein the command is processed via a GPU hardware thread, and wherein the one or more operations further comprises facilitating dispatching of data relating to the processed command via the command buffer.

Example 28 includes the subject matter of Example 25, wherein the one or more operations further comprise: synchronizing the plurality of GPU hardware threads over a plurality of workgroups, wherein each workgroup includes two or more of the plurality of GPU hardware threads processing, in parallel, two or more of the plurality of commands.

Example 29 includes the subject matter of Example 25, wherein the one or more operations further comprise: parsing a command queue to detect one or more dependency events that are to be satisfied before the command sent for processing.

Example 30 includes the subject matter of Example 29, wherein, if the one or more dependency events are detected, the scheduling and processing logic to delay the processing of the command and store the command at a storage medium.

Example 31 includes the subject matter of Example 29, wherein, if the one or more dependency events are not detected, the scheduling and processing logic to schedule the processing of the command without delays.

Example 32 includes the subject matter of Example 29 or 31, wherein the command is re-scheduled to be processed upon satisfaction of the one or more dependency events, wherein the one or more dependency events include at least one of incompletion of processing of a parent command and unavailability of a resource of the plurality of resources.

Example 33 includes the subject matter of Example 32, wherein the parent command represents a base command upon which the command is dependent, and wherein the unavailable resource includes an essential for processing of the command.

Some embodiments pertain to Example 34 includes an apparatus comprising: means for detecting a command of a plurality of commands to be processed at a graphics processing unit (GPU); means for acquiring one or more resources of a plurality of resources to process the command, wherein the plurality of resources include other resources being used to process other commands of the plurality of commands; and means for facilitating processing of the command using the one or more resources, wherein the command is processed in parallel with processing of the other commands using the other resources.

Example 35 includes the subject matter of Example 34, further comprising: means for generating a command buffer corresponding to the command, and wherein the plurality of resources comprise one or more of GPU hardware threads, command buffers, executable code, and memory heaps.

Example 36 includes the subject matter of Example 34 or 36, wherein the command is processed via a GPU hardware thread, and wherein the apparatus further comprises means for facilitating dispatching of data relating to the processed command via the command buffer.

Example 37 includes the subject matter of Example 34, further comprising: means for synchronizing the plurality of GPU hardware threads over a plurality of workgroups, wherein each workgroup includes two or more of the plurality of GPU hardware threads processing in parallel with two or more of the plurality of commands.

Example 38 includes the subject matter of Example 34, further comprising: means for parsing a command queue to detect one or more dependency events that are to be satisfied before the command sent for processing.

Example 39 includes the subject matter of Example 38, wherein, if the one or more dependency events are detected, the scheduling and processing logic to delay the processing of the command and store the command at a storage medium.

Example 40 includes the subject matter of Example 38, wherein, if the one or more dependency events are not detected, the scheduling and processing logic to schedule the processing of the command without delays.

Example 41 includes the subject matter of Example 38 or 40, wherein the command is re-scheduled to be processed upon satisfaction of the one or more dependency events, wherein the one or more dependency events include at least one of incompletion of processing of a parent command and unavailability of a resource of the plurality of resources.

Example 42 includes the subject matter of Example 41, wherein the parent command represents a base command upon which the command is dependent, and wherein the unavailable resource includes an essential for processing of the command.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
one or more memory devices configured to provide a command buffer to store a plurality of commands; and
a graphics processing unit (GPU) coupled to the one or more memory devices and configured to implement logic including
detection and verification logic to detect a command of the plurality of commands to be processed at the GPU,
resource management logic to acquire one or more resources of a plurality of resources to process the command, wherein the plurality of resources include other resources being used to process other commands of the plurality of commands,
scheduling and processing logic to facilitate processing of the command using the one or more resources, wherein the command is processed in parallel with processing of the other commands using the other resources, and
global synchronization logic to synchronize a plurality of GPU hardware threads over a plurality of workgroups, wherein each workgroup includes two or more of the plurality of GPU hardware threads processing in parallel with two or more of the plurality of commands.

2. The apparatus of claim 1, wherein the GPU is further configured to implement command buffer generation logic to generate the command buffer corresponding to the command, and wherein the plurality of resources comprise one or more of GPU hardware threads, command buffers, executable code, and memory heaps.

3. The apparatus of claim 2, wherein the GPU is further configured to implement parsing logic to parse a command queue to detect one or more dependency events that are to be satisfied before the command is sent for processing.

4. The apparatus of claim 3, wherein, if the one or more dependency events are detected, the scheduling and processing logic to delay the processing of the command and store the command at a storage medium.

5. The apparatus of claim 3, wherein, if the one or more dependency events are not detected, the scheduling and processing logic to schedule the processing of the command without delays.

6. The apparatus of claim 3, wherein the command is re-scheduled, via the scheduling and processing logic, to be processed upon satisfaction of the one or more dependency events, wherein the one or more dependency events include at least one of incompletion of processing of a parent command and unavailability of a resource of the one or more resources of the plurality of resources.

7. The apparatus of claim 6, wherein the parent command represents a base command upon which the command is dependent, and wherein the unavailable resource includes an essential resource for processing of the command.

8. The apparatus of claim 1, wherein the command is processed via a GPU hardware thread, and wherein the scheduling and processing logic is further to facilitate dispatching of data relating to the processed command via the command buffer.

9. A method for a graphics processing unit (GPU) comprising:
detecting a command of a plurality of commands to be processed at the GPU;
acquiring one or more resources of a plurality of resources to process the command by the GPU, wherein the plurality of resources include other resources being used to process other commands of the plurality of commands;
facilitating processing of the command using the one or more resources by the GPU, wherein the command is processed in parallel with processing of the other commands using the other resources; and
synchronizing a plurality of GPU hardware threads over a plurality of workgroups by the GPU, wherein each workgroup includes two or more of the plurality of GPU hardware threads processing in parallel with two or more of the plurality of commands.

10. The method of claim 9, further comprising:
generating a command buffer corresponding to the command by the GPU, and wherein the plurality of resources comprise one or more of GPU hardware threads, command buffers, executable code, and memory heaps.

11. The method of claim 9, wherein the command is processed via a GPU hardware thread, and wherein the method further comprises facilitating dispatching of data relating to the processed command via the command buffer by the GPU.

12. The method of claim 9, further comprising:
parsing a command queue to detect one or more dependency events that are to be satisfied before the command is sent for processing by the GPU.

13. The method of claim 12, further comprising wherein, if the one or more dependency events are detected, delaying the processing of the command and storing the command at a storage medium.

14. The method of claim 12, further comprising wherein, if the one or more dependency events are not detected, scheduling the processing of the command without delays.

15. The method of claim 12, wherein the command is re-scheduled to be processed upon satisfaction of the one or more dependency events, wherein the one or more dependency events include at least one of incompletion of processing of a parent command and unavailability of a resource of the one or more resources of the plurality of resources.

16. The method of claim 15, wherein the parent command represents a base command upon which the command is dependent, and wherein the unavailable resource includes an essential resource for processing of the command.

17. At least one non-transitory machine-readable medium comprising a plurality of instructions, when executed on a computing device, to cause the computing device to perform one or more operations comprising:
detecting a command of a plurality of commands to be processed at a graphics processing unit (GPU);
acquiring one or more resources of a plurality of resources to process the command, wherein the plurality of resources include other resources being used to process other commands of the plurality of commands by the GPU; and
facilitating processing of the command using the one or more resources by the GPU, wherein the command is processed in parallel with processing of the other commands using the other resources; and
synchronizing a plurality of GPU hardware threads over a plurality of workgroups by the GPU, wherein each workgroup includes two or more of the plurality of GPU hardware threads processing in parallel with two or more of the plurality of commands.

18. The non-transitory machine-readable medium of claim 17, wherein the one or more operations further comprise:
generating a command buffer corresponding to the command by the GPU, and wherein the plurality of resources comprise one or more of GPU hardware threads, command buffers, executable code, and memory heaps.

19. The non-transitory machine-readable medium of claim 17, wherein the command is processed via a GPU hardware thread, and wherein the method further comprises facilitating dispatching of data relating to the processed command via the command buffer by the GPU.

20. The non-transitory machine-readable medium of claim 17, further comprising:
parsing a command queue to detect one or more dependency events that are to be satisfied before the command is sent for processing by the GPU,
wherein, if the one or more dependency events are detected, delaying the processing of the command and storing the command at a storage medium by the GPU,
wherein, if the one or more dependency events are not detected, scheduling the processing of the command without delays by the GPU.

21. The non-transitory machine-readable medium of claim 20, wherein the command is re-scheduled to be processed upon satisfaction of the one or more dependency events, wherein the one or more dependency events include at least one of incompletion of processing of a parent command and unavailability of a resource of the one or more resources of the plurality of resources.

22. The non-transitory machine-readable medium of claim 21, wherein the parent command represents a base command upon which the command is dependent, and wherein the unavailable resource includes an essential resource for processing of the command.

* * * * *